US011651030B2

(12) United States Patent
Solomon et al.

(10) Patent No.: US 11,651,030 B2
(45) Date of Patent: May 16, 2023

(54) DELTA-BASED CONFLICT-FREE REPLICATED DATA TYPE ARRAYS USING DOT STORES THAT MAP DOTS TO DOT STORES

(71) Applicant: International Business Machines Corporation, Armonk, NY (US)

(72) Inventors: Tomer Solomon, Tel Aviv (IL); Roee Shlomo, Petah Tikva (IL); Paula Kim Ta-Shma, Tel Aviv (IL); Arik Rinberg, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 17/223,306

(22) Filed: Apr. 6, 2021

(65) Prior Publication Data

US 2022/0327160 A1 Oct. 13, 2022

(51) Int. Cl.
*G06F 16/27* (2019.01)
*G06F 16/84* (2019.01)
*G06F 16/182* (2019.01)
*G06F 16/838* (2019.01)

(52) U.S. Cl.
CPC .......... *G06F 16/88* (2019.01); *G06F 16/1844* (2019.01); *G06F 16/273* (2019.01); *G06F 16/838* (2019.01)

(58) Field of Classification Search
CPC ............................................... G06F 16/27–273
See application file for complete search history.

(56) References Cited

U.S. PATENT DOCUMENTS

2017/0024451 A1 1/2017 Sullivan
2020/0311082 A1* 10/2020 Mayr ................ G06F 16/24542
2021/0064590 A1* 3/2021 Venkatesh ............. G06F 16/215

FOREIGN PATENT DOCUMENTS

CN 110569267 A 12/2019

OTHER PUBLICATIONS

Ahmed-Nacer, Mehdi et al., "Concurrency Control and Awareness support for Multi-synchronous Collaborative Edition", Collaboratecom 2013—9th IEEE International Conference on Collaborative Computing: Networking, Applications and Worksharing, Oct. 15, 2013, 11 pages.
Auvolat, Alex et al., "Merkle Search Trees: Efficient State-Based CRDTs in Open Networks", SRDS 2019—38th IEEE International Symposium on Reliable Distributed Systems, Oct. 3, 2019, 11 pages.
Enes, Vitor et al., "Efficient Synchronization of State-based CRDTs", arXiv:1803.02750v3, Mar. 11, 2019, 13 pages.
Kleppmann, Martin, "Moving elements in List CRDt", PaPoC, Apr. 27, 2020, 6 pages.

* cited by examiner

*Primary Examiner* — Robert W Beausoliel, Jr.
*Assistant Examiner* — Nirav K Khakhar
(74) *Attorney, Agent, or Firm* — Barry D. Blount

(57) ABSTRACT

An example system includes a processor to receive deltas corresponding to concurrently executed operations of a number of other replicas on an element of a delta-based conflict free replicated data type (CRDT) array of a distributed computing system. The processor is to modify, at the first replica, the element of the delta-based CRDT array based on the deltas using a dot store that maps dots to a dot store.

19 Claims, 14 Drawing Sheets

200

DELTA-BASED CONFLICT-FREE REPLICATED DATA TYPE ARRAYS USING DOT STORES THAT MAP DOTS TO DOT STORES

BACKGROUND

The present techniques relate to distributed computing systems. More specifically, the techniques relate to distributed computing systems using delta-based conflict-free replicated data types.

Distributed collaboration on semi-structured data documents is a major challenge in the distributed computing domain. For example, semi-structured data models are typically composed of primitive types, maps, and arrays. Primitive types may include a string or an integer. Maps may be an unordered list of values identified by keys. Arrays may include an ordered list of items. In some examples, any of these types can be nested. For example, a map may contain a list which may contain primitive types, etc. Examples of data formats that support semi-structured models are JSON, XML, and YAML. In addition, databases such as NoSQL databases store their content in semi-structured data documents. In distributed environments where databases have multiple instances, content may need to be coordinated between multiple replicas. Therefore, such distributed databases may use a mechanism to synchronize these three types efficiently between their replicas.

However, due to network latencies, the use of a centralized synchronization mechanisms for semi-structured documents may be too costly. Therefore, asynchronous methods for synchronization may be used. Among these asynchronous methods is conflict-free replicated data types (CRDT). For example, major NoSQL databases, such as the Redis, Riak, and Apache Cassandra databases, utilize CRDTs.

In CRDT systems, many replicas of the same object or document may exist. As used herein, a replica refers to the same object or document distributed across some devices. For example, replicas may be used in distributed data centers, in computing devices such as smartphones or laptops. As one particular example, replicas may be used in browsers while two users are working on the same document. Thus, each user may be working on a local replica of the document. When a user wants to modify some object, the user may typically connect to one of the replicas and send an update. After the replica receives the update, the replica processes the update. The replicas may then synchronize asynchronously. For example, each replica may transmit data to the rest of the replicas. Conflict-free Replicated Data Types (CRDTs) allow multiple users to concurrently update shared objects, while ensuring eventual convergence into some consistent state. CRDTs are often split into two main families: operation-based (op-based) CRDTs and state-based CRDTs. Op-based CRDTs are simpler and use smaller messages, but they assume reliable exactly once ordered messaging. However, such reliability may be hard to maintain even when Transmission Control Protocol (TCP) is used.

State-based CRDTs were defined by Shapiro et al. in 2011. The values of this data structure form a join-semilattice. A join-semilattice is a partially ordered set that has a join (a least upper hound) for any nonempty finite subset. In the context of State-based CRDTs, a join-semilattice defines a join operation over its values. For example, when a user wants to modify data stored in the replicas, the user may communicate with some replica and not directly with all replicas. The replicas may then synchronize by sending their entire state to each other. During synchronization, after replica A receives the state of replica B, replica A merges the state of replica B with its own current state using the join operation defined by the join-semilattice. Thus, messages in state-based CRDT systems include the entire state. However, in many cases, including the entire state may be prohibitively large.

Almeida et al. introduced delta-based CRDTs in 2016 to combine the benefits of both state-based CRDT and op-based CRDTs. Delta-based CRDTs are defined to be the same as state-based CRDTs, but instead of sending over the network the entire state, only a difference, also referred to as a delta, from previous state is sent over the network. Delta—based CRDTs are therefore also objects that reside in join-semilattices. The state of a delta-based CRDT is a dot store paired with a causal context, where the dot store defines the join operation of a join-semilattice. A delta may be computed by applying a delta-mutator to the current state of a replica. For example, a CRDT may define abstractions for generating delta-mutators, which may correspond to operations such as update, insert, delete, etc. A delta-mutator $m\delta$ is a function, corresponding to an update operation, which takes a state X in a join-semilattice, S as parameter, and returns a delta-mutation $m\delta(X)$. For example, when applied to a current state of a replica, the delta-mutator may produce a delta-mutation, also referred to herein as a delta. This delta may then be sent over to other replicas of a delta-based CRDT system. In some cases, these deltas can be joined together to form a delta-group. In various examples, a delta-group may be a single delta-mutation, or a join of multiple delta-mutations. Thus, a delta-based-CRDT may only send a delta instead of the entire state to other replicas for synchronization, thereby reducing communication overhead. However, the delta-based CRDT approach includes the use of causal consistency and designing causal delta-CRDTs is non-trivial. In particular, arrays may be particularly difficult to implement in delta-CRDTs.

For example, many existing methods for CRDT array implementation do not support move operations. In addition, some methods that do support move operations may create duplications during the move operations if multiple users move the same element concurrently. Such duplications may not be desirable. For example, if two or more move operations are received concurrently, some operation moving a specific word to the beginning of the sentence and some operation moving it to the end of the sentence, then the result may be the word being repeated and be both at the beginning and end of the sentence. Moreover, such methods may not support nesting. For example, in such methods, an array may not be able to be included as an object within another array. Also, some of these methods involve the use of tombstones. Tombstones are placeholders that track information that has been removed from an array or other data structure. Tombstones may be used to perform undo operations as well as synchronize arrays. However, the use of tombstones may be resource intensive with regards to memory usage, particularly in larger data sets. Finally, many of the existing methods for implementing CFDT arrays are not delta-based CRDT approaches, and are therefore less efficient in terms of data transmitted over the network.

SUMMARY

According to an embodiment described herein, a system can include processor to receive, at a first replica of a distributed computing system, deltas corresponding to concurrently executed operations of a number of other replicas on an element of a delta-based conflict free replicated data type (CRDT) array. The processor can also further modify, at the first replica, the element of the delta-based CRDT array based on the deltas using a dot store that maps dots to a dot store. The system may thus enable a delta-based CRDT array in a distributed computing system. Preferably, a concurrent update to a value of a key and a remove of the key results in the key being deleted from the dot store. In this embodiment, the using dots as the keys enables deletion of a key when there is a concurrent deletion of a key and an update to its value without keeping tombstones. Optionally, a position of the element is stored in a forest in the dot store and the element is modified using the forest, where an update or a delete operation removes an entire tree from a root in the forest. In this embodiment, the use of a forest may enable resolution of concurrent moves and updates or deletes. Preferably, the delta-based CRDT array includes a remove-wins array based on a set of remove-wins semantics or an observed-remove array based on a set of update-delete-move (UDM) semantics. In this embodiment, the use of remove-wins semantics or UDM semantics enables efficient resolution of concurrent moves and updates or deletes. Optionally, the delta-based CRDT array includes a nested array. In this embodiment, multiple types of delta-based CRDT arrays may be used.

According to another embodiment described herein, a method can include receiving, via a processor at a replica of a distribution computing system, deltas corresponding to concurrently executed operations of a number of other replicas on an element of a delta-based conflict free data type (CRDT) array. The method can further include modifying, via the processor, the element of the delta-based CRDT array on the replica based on the deltas using a dot store that maps dots to a dot store. The method may thus enable a delta-based CRDT array in a distributed computing system. Optionally, the delta-based CRDT array includes an observed-remove array, and modifying the element includes updating a value of the element in the observed-remove array in response to detecting that the concurrent mutations include an update operation and a delete operation on the element. In this embodiment, giving preference to updates over delete operations prevents loss of user data during concurrent operations. Optionally, the delta-based CRDT array includes an observed-remove array, and modifying the element includes updating a value of the element in the observed-remove array in response to detecting that the concurrent mutations include an update operation and a move operation on the element. In this embodiment, giving preference to updates over move operations enables the replica to save less metadata. Optionally, the delta-based CRDT array includes an observed-remove array, and wherein modifying the element includes deleting the element from the observed-remove array in response to detecting that the concurrent mutations include a delete operation and a move operation on the element. In this embodiment, giving preference to delete over move operations enables the replica to save less metadata. Optionally, the delta-based CRDT array includes a remove-wins array, and wherein modifying the element includes both updating and moving the element in the remove-wins array in response to detecting that the concurrent mutations include an update operation and a move operation on the element. In this embodiment, both updating and moving enables multiple users to work simultaneously on the same array element, where some of them move the element and some of them update its value. Optionally, the delta-based CRDT array includes a remove-wins array, and wherein modifying the element includes deleting the element from the remove-wins array in response to detecting that the concurrent mutations include a delete operation and a move operation on the element. In this embodiment, giving preference to delete over move operations enables the replica to save less metadata. Optionally, the delta-based CRDT array includes a remove-wins array, and wherein modifying the element includes deleting the element from the remove-wins array in response to detecting that the concurrent mutations include a delete operation and an update operation on the element. In this embodiment, giving preference to delete over update operations enables the replica to save less metadata. Optionally, the delta-based CRDT array includes an observed-remove array or a remove-wins array, and modifying the element includes moving the element in the observed-remove array or the remove-wins array to generate a delta-based CRDT array including an unduplicated moved array element in response to detecting that the concurrent mutations include a number of move operations. In this embodiment, the method enables unduplicated concurrent moves in delta-based CRDT arrays. Optionally, the method includes receiving, via the processor, an operation on the delta-based conflict free data type (CRDT) array via a processor at the replica of the distributed computing system, executing, via the processor, a delta-mutator corresponding to the operation and calculate a delta, merging, via the processor, the delta internally to update a state of the replica, and transmitting, via the processor, the delta to the other replicas of the distributed computing system. In this embodiment, the other replicas may be synchronized with the replica.

According to another embodiment described herein, a computer program product for modifying elements of delta-based conflict-free replicated data types (CRDT) arrays can include computer-readable storage medium having program code embodied therewith. The computer readable storage medium is not a transitory signal per se. The program code executable by a processor to cause the processor to receive, at a first replica of a distributed computing system, deltas corresponding to concurrently executed operations of a number of other replicas on an element of a delta-based conflict free data type (CRDT) array of a replica. The program code can also cause the processor to modify the element of the delta-based CRDT array on the replica based on the deltas using a dot store that maps dots to a dot store. The program code may thus enable a delta-based CRDT array in a distributed computing system. Optionally, the program code can also cause the processor to update a value of the element in an observed-remove array in response to detecting that the concurrent mutations include an update operation and a delete operation on the element. In this embodiment, giving preference to delete over move operations enables the replica to save less metadata. Optionally, the program code can also cause the processor to update a value of the element in an observed-remove array in response to detecting that the concurrent mutations include an update operation and a move operation on the element. In this embodiment, giving preference to delete over move operations enables the replica to save less metadata. Optionally, the program code can also cause the processor to delete the element in an observed-remove array in response to detecting that the concurrent mutations include a delete operation and a move operation on the element. In this embodiment, giving preference to delete over move operations enables the replica to save less metadata.

DETAILED DESCRIPTION

According to embodiments of the present disclosure, a system can include a processor to receive, at a first replica of a distributed computing system, deltas corresponding to concurrently executed operations of a number of other replicas on an element of a delta-based conflict free replicated data type (CRDT) array. The processor can modify the element of the delta-based CRDT array based on the deltas using a dot store that maps dots to a dot store. In some examples, the processor can further transmit a delta to other replicas of the distributed computing system. For example, the other replicas may use the delta to similarly modify an element and synchronize with the first replica. In some examples, the delta-based CRDT array may be a nested array. Thus, embodiments of the present disclosure enable indefinite nesting within delta-based CRDT arrays. In addition, the embodiments of the disclosure do not require duplication of elements within an array to execute operations such as a move operation. For example, if two concurrent users each move the same element to a different location, the resulting array may include only one instance of the element that was moved. The embodiments further enable delta-based CRDT arrays that are more efficient in terms of meta-data and data sent over a network of a distributed computing environment. Moreover, the embodiments enable a JSON-like application programming interface (API) that supports concurrent operations, which may include an update operation, a move operation that operates without any duplication, and a delete operation. For example, the embodiments may be used for JSON data in databases such as NoSQL databases. Finally, because the embodiments do not use tombstones, the embodiments enable delta-based CRDT arrays that may be more efficient with regard to used data storage.

Figure 1:
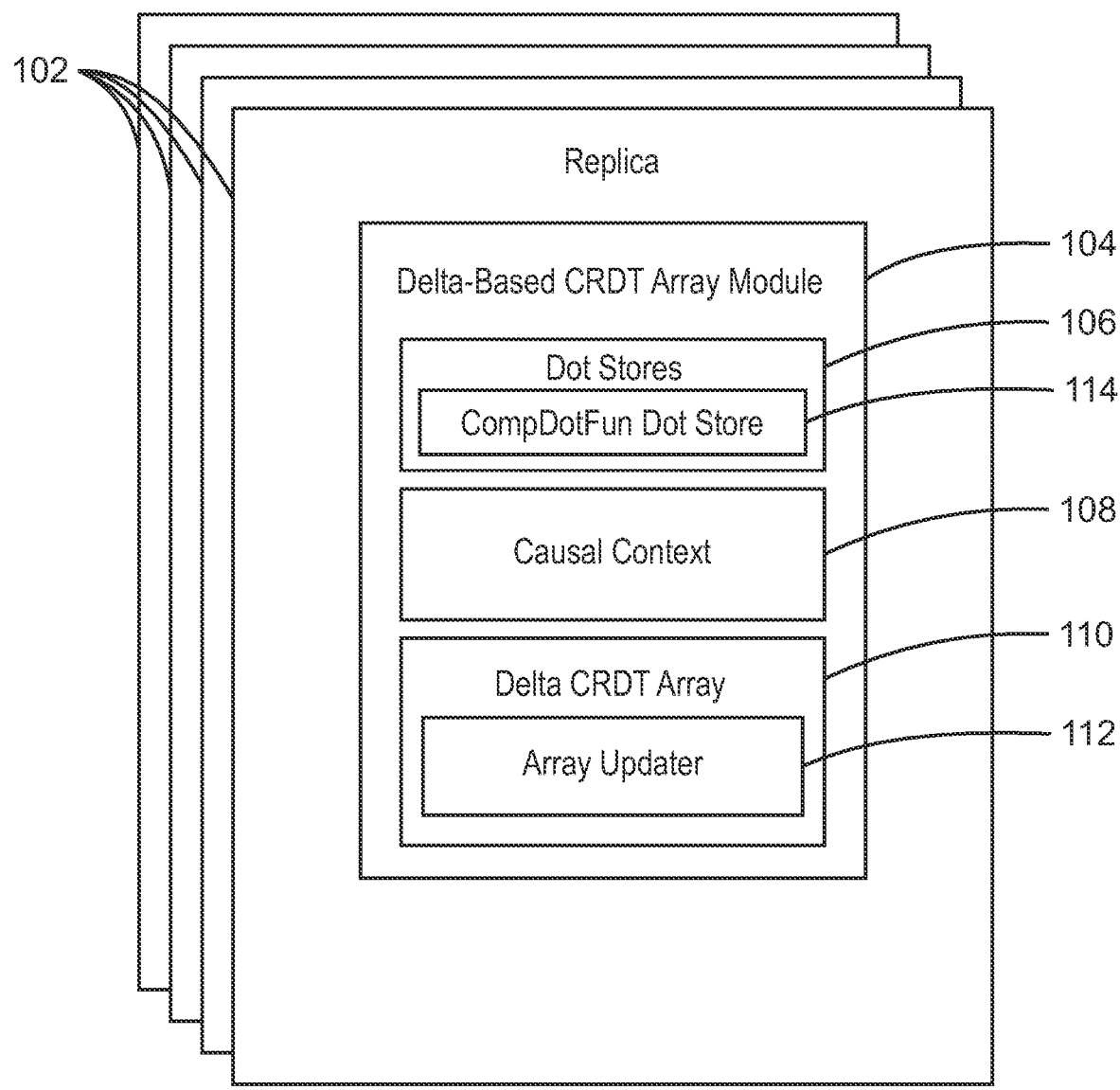
FIG. 1 is a block diagram of an example system for synchronizing delta-based CRDT arrays.

With reference now to FIG. 1, a block diagram shows an example system for synchronizing delta-based CRDT arrays. The example system is generally referred to by the reference number 100. FIG. 1 includes a set of replicas 102. For example, the replicas 102 may be a set of nodes communicatively coupled to each other to form a distributed database. In various examples, each of the replicas 102 may have its own replica identifier. The replicas 102 each have local memory but no shared memory. In addition, there may be no global clock or timing assumptions between the replicas. In various examples, the replicas 102 can communicate with each other via messages, but the messages may be dropped or reordered arbitrarily. However, some of the messages may eventually be delivered.

Each of the replicas 102 includes a delta-based CRDT array module 104. The delta-based CRDT array module 104 includes a CompDotFun dot store 106, a causal context 108, delta CRDT arrays 110, and an array updater 112. The dot stores 106 include a CompDotFun dot store 114. In various examples, the dot stores 106 may also include a dot store, referred to as a DotFun dot store (not shown), that is a map from dots to a join-semilattice. The dot stores 106 may also include a DotMap dot store (not shown) with values that map from some set of keys K to some dot store V.

Delta-based CRDTs may be built using dots, dot stores, and a causal context (CC). A dot, as used herein, is a tuple of values. For example, a dot may be a value pair of a replica-id and event number. Given a set of replicas I, one way to generate unique identifiers for events is for replica 102 i∈I to generate the sequence of pairs (i, 1), (i, 2), . . . and assign a pair per event. Each such pair may be referred to herein as a dot. These dots may represent user events observed by some replica 102 of the set of replicas 102. For example, the replica-id may be a unique identifier for the replica, and the event-number may correspond to a particular observed event by the replica and may indicate the order in which the event was observed relative to other observed events. As one example, a dot may take the form of (id-1, event-5), or in the shorter form (id-1, 5). In various examples, when a user updates a value in a register, a new dot is created to represent that event. In this example, both dots (id-1, 5) and (id-1, 4) may represent events that happened in a first replica 102. However, the event represented by (id-1, 5) may represent an event that happened after the event represented by (id-1, 4). The dots may thus be assigned unique identifiers used to events to track which events have been observed.

The dot stores 106 may be containers for data-type specific information. For example, dot stores 104 may store dots and data in a particular manner. For example, dot stores 106 may store a dots that are both live and up-to-date. A dot store 106 may also provide a function dots( ) for querying the set of event identifiers currently stored in a dot store 106. For example, the dots( ) function may yield all dots which are currently stored by a dot store 106. In various examples, the dot store 106 may hold user data currently stored in the CRDT.

Finally, the causal context 108 is the set of all events in the form of dots that a replica has observed so far. Thus, the causal context 108 may include dots that are no longer present in any of dot stores 106. In various examples, because the casual context 108 is a grow-only set, its size may be unbounded. In some examples, the dots stored in the causal context 108 may therefore be compacted for more efficient storage. For example, when using some anti-entropy algorithms, then for each replica 102 $i \in I$ with causal context 108 $c_i$ and for any replica 102 $j \in I$:

$$1 \leq n \leq \max_j(c_i) \Rightarrow (j,n) \in c_i \qquad \text{Eq. 1}$$

Thus, the casual context can be encoded as a compact version vector that keeps the maximum sequence number for each replica.

In various examples, each of the replicas 102 may be able to call various operations over a causal context 108. In some examples, each of the replicas 102 may also be able to call a max( ) operation. The max( ) operation may provide the maximum sequence number seen so far. For example, the max operation may be defined using the equation:

$$\max_i(c) = \max(\{n | (i,n) \in c\} \cup \{0\}) \qquad \text{Eq. 2}$$

In some examples, the replicas 102 may also be able to call an operation next( ), which yields the next available dot in that particular replica 102. In some examples, this operation may be denoted as next-i( ), to denote the next dot in the i-th replica. For example, in the first replica 102, the first time next( ) is called it will produce the dot (id-1, 1). The next time the operation next( ) is called may produce (id-1, 2), and so on. For example, the next( ) operation may be defined using the equation:

$$\text{next}_i(c) = (i, \max_i(c)+1) \qquad \text{Eq. 3}$$

The state of a replica 102 in delta-based CRDTs may be formed by a combination of a dot store 106 with a causal context 108. In this regard, the notation Causal<V>, also sometimes referred to as Causal<T>, may be used to symbol a causal context combined with V (or T) as the dot store. In some cases, the notation (m, c) may also be used, where m is the dot store and c is the causal context. Thus, the dot store 106 contains the data currently stored in the replica 102, and the causal context 108 provides a causal history. Therefore, a dot that is present in a causal context 108 but not in the corresponding dot store 106, may mean that the dot was present in the dot store 106 at some time in the past, but has since been removed. When joining a replica with a delta or when joining two deltas, a dot present in only one dot store 106, but included in the causal context 108 of the other replica 102, may be discarded.

In the example of FIG. 1, the delta-based CRDT array module 104 also includes a CompDotFun dot store 114. In various examples, the values of the CompDotFun dot store 114 are another dot store. An example CompDotFun dot store 114 may be formally defined as:

$$COMPDOTFUN\langle I \times \mathbb{N}, V{:}DotStore\rangle{:}DotStore = I \times \mathbb{N} \rightharpoonup V \qquad \text{Eq. 4}$$

$$dots(m) = dom\ m \cup \bigcup_{v \in ran\ m} dots(v)$$

where I refers to the replica IDs, N refers to sequence numbers, V is a DotStore, m is a dot store mapping dots I×N to dot store V, dom m is the domain of all the keys of the dot store m, and d is a key. As used herein, a standard notation for sets and maps is provided, such that a map is a set of key-value pairs {k→v} or {d→v}, where each key k or d is from some set K, and associated with a single value v. Given a map m and a key k∈K its associated value may be denoted by m(k). In other words, m(k) may denote the mapping of key k. The domain of a map m is denoted dom m and the range of a map m as ran m. In other words, dom m={k|{k→v}∈m} and ran m={v|{k→v}∈m}. Most sets used are at least partially ordered, and the existence of a least element ⊥ is assumed. For a map m and some key k, if k∉dom m, then m(k)=⊥. In other words, all keys not present in the map are mapped to ⊥, unless specified otherwise. In various examples, dot stores V may themselves reference additional dot stores, and thus may be referred to as nested. The function dots(m) is used to return all dots existing in DotStore. In various examples, a join-semilattice for causal delta-CRDTs based on the CompDotFun dot store may be formally defined as:

Causal $\langle T{:}\text{DotStore}\rangle = T \times \text{CausalContext}$ $\sqcup : \text{Causal}\langle T \rangle \times \text{Causal}\langle T \rangle \to \text{Causal}\langle T \rangle$ when $T{:}\ \text{CompDotFun}\langle\_\rangle$ $(m,c) \sqcup (m',c') = (\{d \to v(d) | d \in \text{dom } m \cap \text{dom } m' \wedge v(d) \neq \bot\} \cup$ $\{(d,v) \in m | d \notin c'\} \cup \{(d,v) \in m' | d \notin c\}, c \cup c')$ where $v(d) = \text{fst}((m(d),c) \sqcup (m'(d),c'))$ Eq. 5 where m and m' are dot stores, c and c' are causal contexts, d is a key, and fst (p) and scnd(p) may denote the first element and second element of a pair p, respectively. In the example of Eq. 5, a recursive function is used to compute the values resulting from the join of (m, c) and (m', c').

In various examples, the values of the CompDotFun dot store 114 may be combined with a casual context 108 to generate a join-semilattice. As described above, a dot appearing in a causal context has been seen. Therefore, if a dot appears in the causal context but not in the state then it has been removed. This enables keeping track of removed elements. For example, an element may survive a join if it appears in both maps. In this example, the element has not been removed. In some examples, the element survive if it appears in one CompDotFun dot store 114 but not in the causal context 106 of the second CompDotFun dot store 114. In these examples, the element has not been observed by the replica on the other side. In various examples, a join may then recursively applied on the elements of the CompDotFun dot store 114. This construction allows forgoing tombstones, because the causal context 106 contains the information in an efficient and compressed manner. An example join is depicted and described with respect to FIG. 2 below.

In various examples, the delta CRDT array 110 may be a map from dots to pairs of the form (value, position). The dots may thus act as unique identifiers. In various examples, the value may be an arbitrary dot store 106. For example, the dot store 106 may include any dot store that is combinable with a causal context to create a join-semilattice. Thus, the delta CRDT array 110 may support nesting because the dot store 106 that resides in the value part of the pair (value, position) can be a nested dot store. In some examples, the position may be stored as a forest in the CompDotFun dot store 114. For example, the roots of the forest may be the dots corresponding to the last value-updates. The last value-updates may include the insertion of an element, if no further updates have been made. In various examples, the second height may be the dots of the last move operations. Otherwise, if no move happened, then the second height may be the dot of the last update or the insertion. The leaves may store the actual position identifier. In various examples, any suitable scheme in which the position identifiers themselves encode their relative ordering may be used as a scheme. For example, the scheme used may be the LSEQ adaptive structure first introduced in September 2013, the Logoot algorithm first introduced 2009, or the Treedoc CRDT design first introduced in 2009, etc. In various examples, the position identifiers may be from a totally ordered set such that they may be used to sort the array elements in a deterministic order.

The delta CRDT array 110 may support various mutations. For example, the delta CRDT array 110 may include an application programming interface (API) supporting the various mutations. In various examples, the mutations may include an insert operation. For example, the insert operation may be in the form of Insert(val, pos), where val is the value to be inserted and pos refers to the position in an array at which to insert the value. The mutations may also include an update operation. For example, the update operation may be in the form Update(newVal, pos), where newVal refers to the updated value and pos refers to the position in an array of the value to be updated with the updated value newVal. In the example of a forest, an update operation may delete all roots and create a new tree. The mutations may also include a move operation. For example, the move operation may be in the form of Move(oldPos, newPos), where oldPos refers to the original position of the value to be moved in an array, and newPos refers to the position to which the value is to be moved within the array. A move operation may delete all children of existing roots, and add a single child tree to all existing roots. The mutations may also further include a delete operation. For example, the delete operation may be in the form Delete(pos), where pos refers to the position within an array of the element to be deleted. In various examples, a delete operation at the delta CRDT array 110 may delete all roots in the forest.

In various examples, the delta CRDT array 110 may be a Remove-Wins Array (RWArray) or an Observed-Remove Array (ORArray). Both arrays are essentially a map of dots, acting as unique identifiers, to pairs of value and positions. The RWArray and the ORArray differ in the way they utilize the CompDotFun dot store 114. However, in both arrays the stable position identifiers are from some totally ordered set P, therefore the stable position identifiers can be used to sort the array elements in a deterministic order. Both arrays may support the four mutations: Insert, Move, Update, and Delete.

In some examples, the delta CRDT array 110 may be an observed-remove array (ORArray). In various examples, the ORArray delta CRDT array 110 may be based on a set of observed-remove semantics that are specific for the ORArray array. In the observed-remove semantics, an order of precedence is defined between the operations update, move, and delete. In particular, the order may be as follows: update the value of an element with highest precedence, then delete element, and then move element to a new position with a lowest precedence. The observed-remove semantics may thus also be referred to as UDM semantics based on the order of precedence of update-delete-move. An example set of UDM semantics representing the causality order are formally described in the following chart:

Let a be an array, H be a full history of events for a, let ≺ be a partial order of the history, and let $o_i$ be an operation acting on unique element identifier i in a. Then let:

$$dom a = \{i \mid \exists \text{ insert } (i, v, p) \in H \land \forall \text{ delete } (i) \in H : \exists \text{ update } (i, v, p) \in H : \text{update } (i, v, p) \| \text{ delete } (i)\},$$

$$fst(a(i)) = \bigsqcup \{v \mid [\text{insert } (i, v, p) \in H : \forall o_i \in H \cap \{\text{delete } (i), \text{update } (i, -, -)\} : \text{insert } \not\prec o_i]$$

$$\lor [\exists \text{ update } (i, v, p) \in H : \forall \text{ delete } (i) \in H : \text{update } (i, v, p) \not\prec \text{ delete}]\}$$

$$scnd(a(i)) = (\bigsqcup \{p \mid \exists \text{ } i\text{insert } (i, v, p) \in H : \forall o_i \in H : \text{insert } (i, v, p) \not\prec o_i\})$$

$$\bigsqcup \bigsqcup \{p \mid \exists \text{ update } (i, v, p) \in H : \forall o_i \in H : \text{update } (i, v, p) \not\prec o_i\})$$

$$\bigsqcup (\{p \mid \exists \text{ move } (i, p) \in H : \forall o_i \in H \cap \{\text{delete } (i), \text{update } (i, -, -)\} : o_i \prec \text{ move } (i, p)\})$$

where, in the above chart, i is an element identifier, v is a value to be stored, and p is a position in the array. The order of precedence means that an operation of higher precedence overrides a concurrently received operation of lower precedence. Thus, update has higher precedence over delete and move operations and may override these operations when concurrently received. Similarly, delete has higher precedence over a move operation and may override the move operation when concurrently received. The precedence given to the update operation may be due to the update operation committing some position. For example, the update operation may be described as recommitting the current position. As elements are removed based on their values and not their positions, this order of operations is still observed-remove (OR) because none of the elements are blindly removed. In various examples, the precedence is defined per each array element separately. For example, operations performed on different array elements may not collide or influence each other with respect to semantics. Since a value update has higher priority than a delete, a user can delete an array element only after seeing all updates to the value of the element. In other words, a delete happening concurrently with a value update will be ignored. An example of an update overriding a delete is shown in FIG. 3B below. In addition, since the move operation has the lowest precedence, any other operation overrides the move operation. This means that if a move operation happens concurrent to update of value, then the value update wins. An example of a concurrent move operation and update operation is described in FIG. 3C. Also, an element deletion concurrent to a move operation beats the move operation, and the item is deleted. Thus, the item may be deleted from both the old and the new location. An example concurrent move operation and delete operation is described in FIG. 3D.

An example ORArray variant of delta CRDT array 110 is formally described in the following chart:

$$\text{ORArray} \left( \text{Causal} \left( V \right), P \right) =$$

Causal⟨ DotMap⟨ I×N, Pair⟨ V,CompDotFun⟨ Dot-Fun⟨ P⟩⟩⟩⟩⟩ insert$_i^\delta$(v,p,(m,c))=({d→(v,{d→{d→p}})},{d})

where $d$=next$_i$(c)

apply$_i^\delta$(d,o$_i^\delta$,p,(m,c))=({d→(v,{d'→{d'→p}})}, c∪{d'}∪roots)

where (v,c')=o$_i^\delta$(fst(m(d)),c) and $d'$=next$_i$(c∪c')

and roots={r|(r,_)∈scnd(m(d))} move$_i^\delta$(d,p,(m,c))=({d→(⊥,ps)},c∪{d}∪children)

where $d$=next$_i$(c) and children={dots(child)|(_,child)∈scnd(m(d))} and ps={{r→{d→p}}|(r,_)∈scnd(m(d))} delete$_i^\delta$(d,(m,c))=(⊥, dots(m(d)))

clear$_i^\delta$((m,c))=(⊥, dots(m))

In various examples, the position may be stored as a forest of directed graphs stored in CompDotFun dot stores 114. In some examples, the root is the dot of the last seen update. Otherwise, if no update exists, then the root may be the dot of corresponding to the insertion of the element to the array. In various examples, the second height is the dot of the last move operation. Otherwise, if no move exists, then the second height may be the dot after an insertion. In some examples, the second height may also be the dot of the last update. The second and the third heights may be stored in a DotFun dot store 106. In some examples, on an update operation, the replica 102 deletes all observed roots and adds a single tree of height 3. On a move operation, the replica 102 deletes all children of all existing roots, and adds a single child tree to all roots. The worst case memory complexity of a single element in an array is O(n$^2$), where n is the number of replicas 102. This is achieved when all replicas 102 concurrently update an element without observing each other, all these updates are received by every replica 102, and then every replica 102 concurrently moves the element. By the formal definition, the values of a DotFun dot store 106 used as position identifiers should come from a lattice. However, in this use of DotFun dot store 106, there is no merge between different "values" under the same key, or dot. Therefore, in some examples, position identifiers which do not necessarily form a lattice may be used. An example operation of the ORArray is described with respect to the example systems of FIGS. 3A-3F below.

In various examples, the delta CRDT array 110 may alternatively be a remove-wins array (RWArray). The RWArray delta CRDT array 110 may be a variant that supports remove-wins semantics. In RW semantics, if a Delete of an array element occurs concurrently to any other operation on that element, then the element is deleted. The Move and Update operations may be equal. For example, neither happening concurrently affects the other. For example, the precedence of a set of remove-wins semantics may be such that a delete operation beats a concurrent move operation or a concurrent update operation. However, if concurrent move and an update operations are received, then the precedence of the set of remove-wins semantics may be such that the item is both moved and updated. An example ORArray variant of delta CRDT array 110 is formally described in the following chart:

RWArray⟨ Causal⟨ V⟩⟩=Causal⟨ CompDotFun⟨ Pair⟨ V, DotFun⟨ P⟩⟩⟩⟩ insert$_i^\delta$(v,p,(m,c))=({d→(v,{d→p})},{d})

where $d$=next$_i$(c)

apply$_i^\delta$(d,o,(m,c))=({d→(v,⊥)},c')

where (v,c')=o$_i^\delta$(fst(m(d)),c)

move$_i^\delta$(d,p,(m,c))=({d→(⊥,{d'→p})},{d'}∪c')

where $d'$=next$_i$(c) and c'=dots(scnd(m(d)))

remove$_i^\delta$(d,(m,c))=(⊥,{d})

clear$_i^\delta$((m,c))=(⊥,dom m)

In the RWArray, the top level dot store is the CompDotFun dot store 114. A dot present in the causal context 108 but that does not exist as a key in the CompDotFun dot store 114 represents an item which has been deleted from the array. Therefore, this element will not be in the array after a join with a delta. In various examples, the positions may stored in a Multi-Value Register (MVReg), such that a single value can be chosen in a deterministic fashion, but conflicts are kept. In some examples, if conflicts are of no interest, then a Last-Write-Wins Register (LWWReg) can be used instead.

The array updater 112 may thus modify the delta CRDT array based on any combination of received deltas from other replicas 102. In some examples, the array updater 112 may thus modify the delta CRDT array using any combination of delta CRDT array 110. In various examples, a nested delta CRDT array may include both an ORArray and an RWArray. For example, the ORArray and an RWArray semantics may be used for the semantics of the nested delta CRDT array, and the RWArray or ORArray semantics used for one or more of the nested elements of the nested delta CRDT array. The array updater 112 can also modify the delta CRDT array in response to any operation executed on the local replica 102. For example, locally executed operations may be performed in the order in which they are received.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional replicas, or additional dot stores, delta CRDT arrays, etc.). For example, the replicas may include additional modules for other CRDT data structures, such as maps and registers. For example, the maps may include an ORMap and the registers may include an MVReg register.

Figure 2:
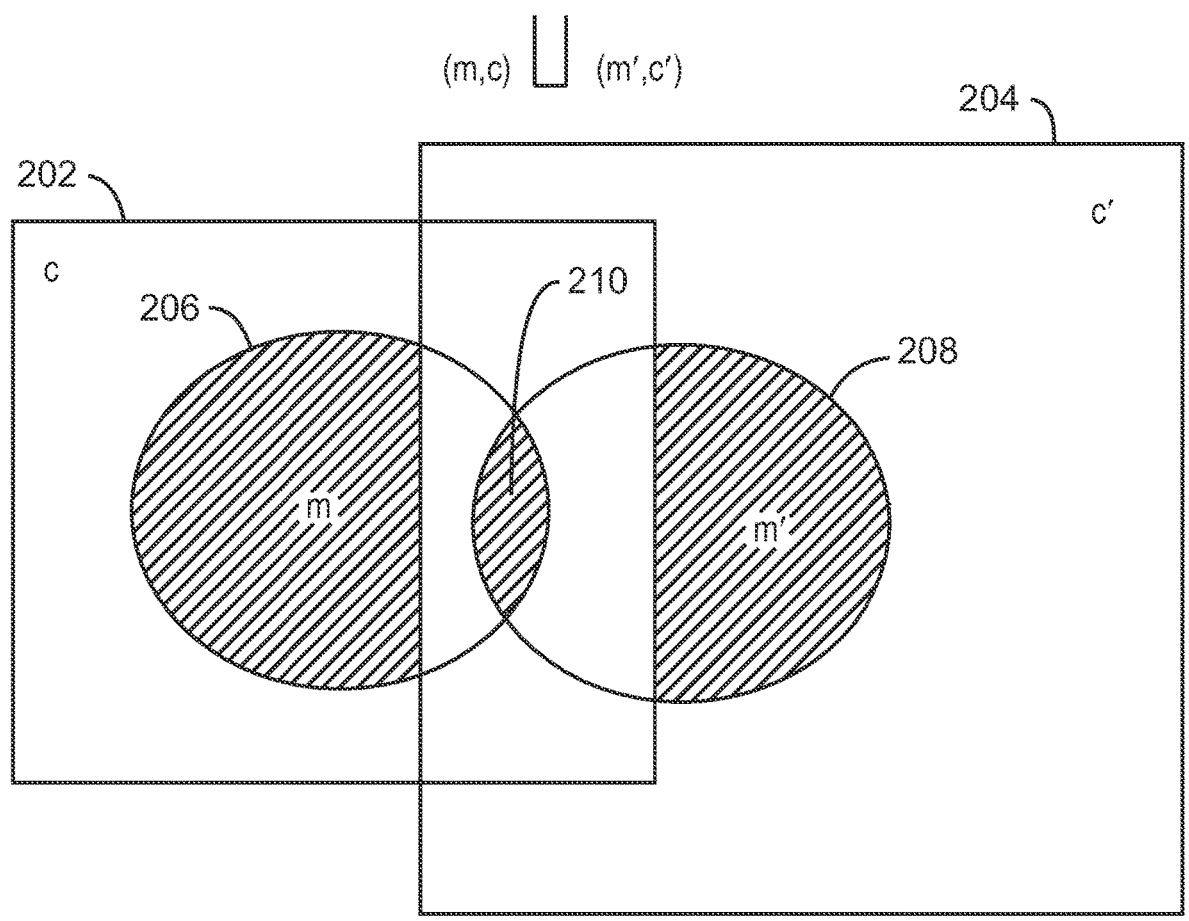
FIG. 2 is a Venn diagram depicting an example set of dots surviving a join of two instances of CompDotFun dot store, where each CompDotFun dot store has its own causal context.

FIG. 2 is a Venn diagram depicting an example set of dots surviving a join of two instances of CompDotFun dot store, where each CompDotFun dot store has its own causal context. The CompDotFun dot store 200 may be implemented in the replicas 102 of FIG. 1 using the computing device 500 of FIG. 5 or the computer-readable media 800 of FIG. 8.

FIG. 2 includes an overlapping set of casual contexts 202 and 204 with corresponding overlapping CompDotFun dot stores m and m'. A set of dots surviving the join of CompDotFun dot stores m and m' is indicated by shaded areas 206, 208, and 210. In particular, the set of dots 206 includes the dots in CompDotFun dot store m that do not appear in the causal context 204. The set of dots 208 includes the dots in CompDotFun dot store m' that do not appear in the causal context 202. The set of dots 210 includes dots that appear in both causal contexts 202 and 204 and in both CompDotFun dot stores in and CompDotFun dot store m'.

It is to be understood that the block diagram of FIG. 2 is not intended to indicate that the CompDotFun dot store 200 is to include all of the components shown in FIG. 2. Rather, the CompDotFun dot store 200 can include fewer or additional components not illustrated in FIG. 2 (e.g., additional dot stores, or additional causal contexts, etc.). For example, the CompDotFun dot stores m and m' may be nested dot stores that contain one or more additional dot stores, and these dot stores could be nested themselves. However, only one causal context 202 and 204 may be associated with each of the dot stores m or m'.

Figure 3A:
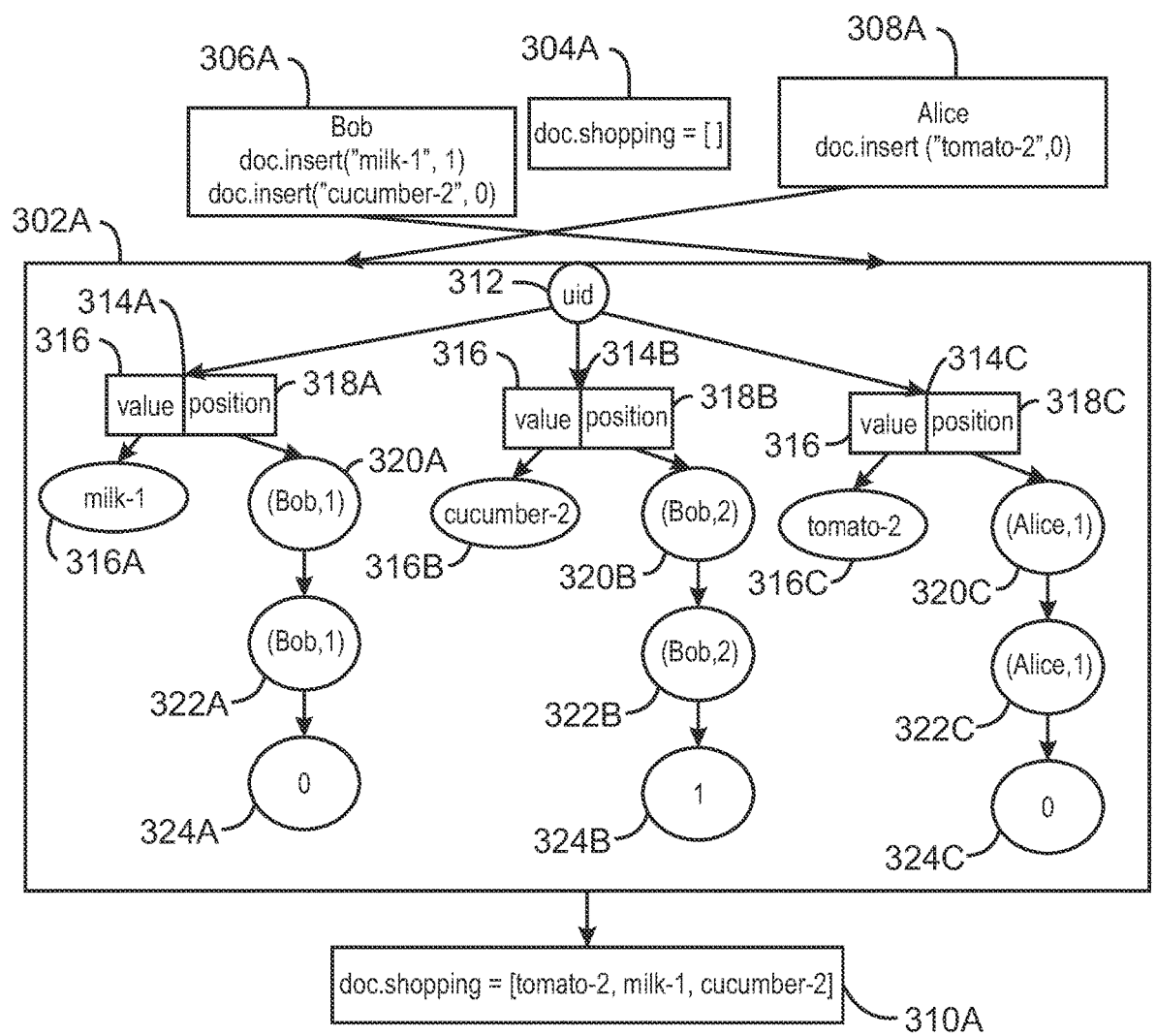
FIG. 3A is a block diagram of an example forest of a CompDotFun dot store having been synchronized after receiving concurrent mutations to insert elements into a delta-based CRDT array.
Figure 3B:
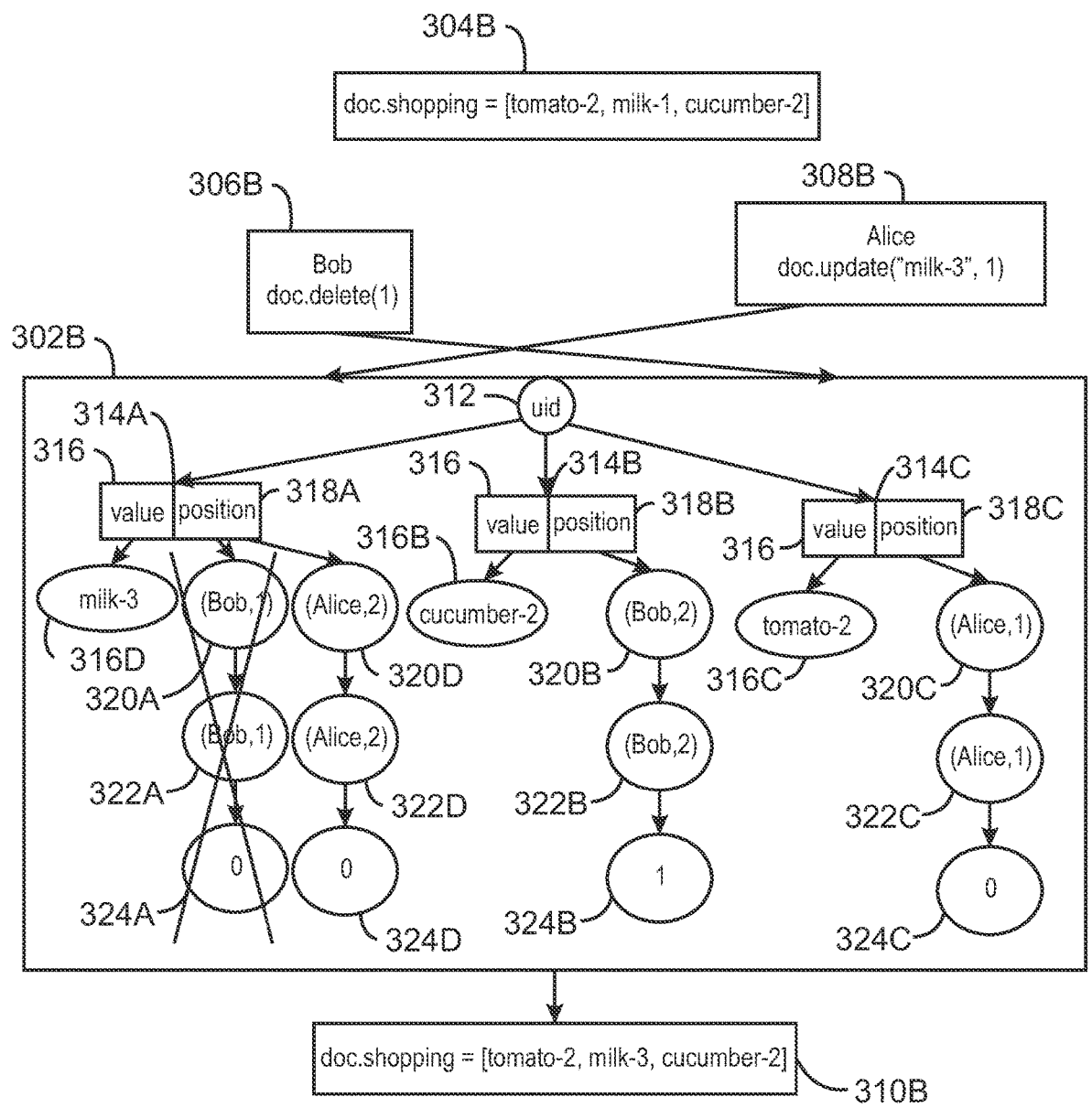
FIG. 3B is a block diagram of the example forest of a CompDotFun dot store having been synchronized after receiving concurrent mutations to delete and update an element of a delta-based CRDT array.

FIG. 3A is a block diagram of an example system with a forest of a CompDotFun dot store having been synchronized after receiving concurrent mutations to insert elements into a delta-based CRDT array. The example system 300A may be implemented using the system 100 of FIG. 1, the computing device 500 of FIG. 5 or the computer-readable media 800 of FIG. 8.

The system 300A of FIG. 3A includes an ORArray CRDT 302A based on an empty input array 304A and mutations 306A and 308A, received from users Bob and Alice, respectively. The ORArray CRDT 302A is shown outputting an output array 310A. The ORArray CRDT 302A maps unique identifiers (uid) node 312 to three array elements 314A, 314B, and 314C. In the examples of FIGS. 3A-3F, each of the array elements 314A, 314B, and 314C have a unique identifier 312 associated with a particular items including cucumbers, tomatoes, and milk. In various examples, the uids 312 may each be in the form of a dot. Each of the items 312A, 312B, and 312C are split into two sub-items including values 316 and positions 318. For example, the values 316 may include the number and name of the items and the positions 318 may include the relative position of the items in the array. In some examples, any of the values 316 may be nested. For example, the values 316 themselves may be arbitrary CRDTs. In various examples, the positions 320A, 320B and 320C may be used to sort the items 314A, 314B, and 314C. The positions 318 are each split into three levels. A first level of positions includes positions 320A, 320B, and 320C. The first level, or root, may be the dot of the last seen update or insertion if no update exists. A second level of positions includes positions 322A, 322B, and 322C. The second level is the dot of the last move operation or dot of the last update if no move exists, or dot of the insertion if no update was made. A third level of positions includes positions 324A, 324B, and 324C. The third level of positions may be values of the positions. In various examples, the third level of positions may include any type of suitable position identifiers. In the examples of FIGS. 3A-3F, a simple integer system is provided in which each of the elements 314A, 314B, and 314C is assigned an integer. For example, the assigned integers may be values such as −1, 0, 1, 2 etc. The ordering of the array elements may be based on the ordering of these integers. For example, if element A has position value 0, and element B has position value 1, then element A is before element B. If, element B has position value −1, then it would be before element A. In the example of FIG. 3A, the element 314A is assigned the integer 0, the element 314B is assigned the integer 1, and the element 314C is also assigned the integer 0. In some examples, each element may have a different position identifier. However, if two items have the same position identifier such as in FIG. 3A, then a tie-breaking mechanism may be used. For example, the tie-breaking mechanism may be based on the dots in the forest. In various examples, a position identifier may not be an integer. For example, the position identifiers may use fractions instead of integers. In some examples, the position identifiers may be alternatively stored as dots. In these examples, the values of the dots may be used for the tie-breaking mechanism, which may be an alphabetical order or any other suitable rule. For example, given two dots (Alice, 0) and (Bob, 0), (Alice, 0) may be given a preference in order because Alice is alphabetically ordered before Bob.

In the example of FIG. 3A, a first user Alice adds tomatoes to the virtual shopping cart that is implemented using a distributing computing system using a delta CRDT array, as indicated by mutation 308A. A second user Bob adds two cucumbers and milk to the virtual shopping cart, as indicated by mutation 306A.

As shown in FIG. 3A, three array elements are generated with each corresponding to an item in the shopping cart. The resulting output array 310A may be [tomato—2, milk—1, cucumber—2], indicating two tomatoes at the beginning, one milk in the middle of the list, and two cucumbers at the end of the list.

It is to be understood that the block diagram of FIG. 3A is not intended to indicate that the system 300A is to include all of the components shown in FIG. 3A. Rather, the system 300A can include fewer or additional components not illustrated in FIG. 3A (e.g., additional users, mutations, trees, forests, unique identifiers, or alternative semantics, etc.). For example, the system 300A may alternatively have used remove-wins semantics, in which case the output array 310A would remain the same and the forest structure would not be used. In various examples, the third level of position values may be replaced with any suitable position identifiers of any suitable position identifier system.

FIG. 3B is a block diagram of the example system with a forest of a CompDotFun dot store having been synchronized after receiving concurrent mutations to delete and update an element of a delta-based CRDT array. The example system 300B may be implemented using the system 100 of FIG. 1, the computing device 500 of FIG. 5 or the computer-readable media 800 of FIG. 8.

The system 300B of FIG. 3B includes similarly referenced elements from FIG. 3A. In addition, FIG. 3B includes an ORArray CRDT 302B based on an input array 304B and mutations 306B and 308B, received from users Bob and Alice, respectively. For example, the input array 304B may be the output array 310A of FIG. 3A. The ORArray CRDT 302B is shown outputting an output array 310B. Moreover, value 316A has been replaced with value 316D and the branch including positions 320A, 322A, and 324A has been deleted. A new branch with positions 320D, 322D, and 324D is included in the forest under 318 in 314A.

In the example of FIG. 3B, a first user Alice updates the number of milk cartons in the virtual shopping cart. The second user Bob concurrently removes the milk cartons item from the virtual shopping cart that is implemented using a distributing computing system using a delta CRDT array. Because the values 316 are governed by observed-remove semantics in the example of FIGS. 3A-3F, the array element 314A has not been deleted, but instead its value 316 is updated with a new amount to reflect Alice's update. Thus, the milk value has been updated to 316D to indicate three milks. With regards to positions 318, the tree including 320A, 322A, and 324A corresponding to Bob's previous milk order is removed and replaced by a new tree including positions 320D, 322D, and 324D to reflect Alice's update. In particular, the value of 324D is the same as previous value 324A, reflecting that the updated value should be kept in the original position. The removed tree would also be removed by the delete mutation 306B from Bob to delete the milks, but is already removed by the update mutation 308B from Alice. The resulting final output array 310B is therefore [tomato—2, milk—3, cucumber—2], indicating an updated amount of milk, and no removal of any milk.

It is to be understood that the block diagram of FIG. 3B is not intended to indicate that the system 300B is to include all of the components shown in FIG. 3B. Rather, the system 300B can include fewer or additional components not illustrated in FIG. 3B (e.g., additional users, mutations, trees, forests, unique identifiers, or alternative semantics, etc.). For example, the system 300B may alternatively have used remove-wins semantics, in which case the output array 310B would have the milk deleted and the forest structure would not be used. In various examples, the third level of position values may be replaced with any suitable position identifiers of any suitable position identifier system.

Figure 3C:
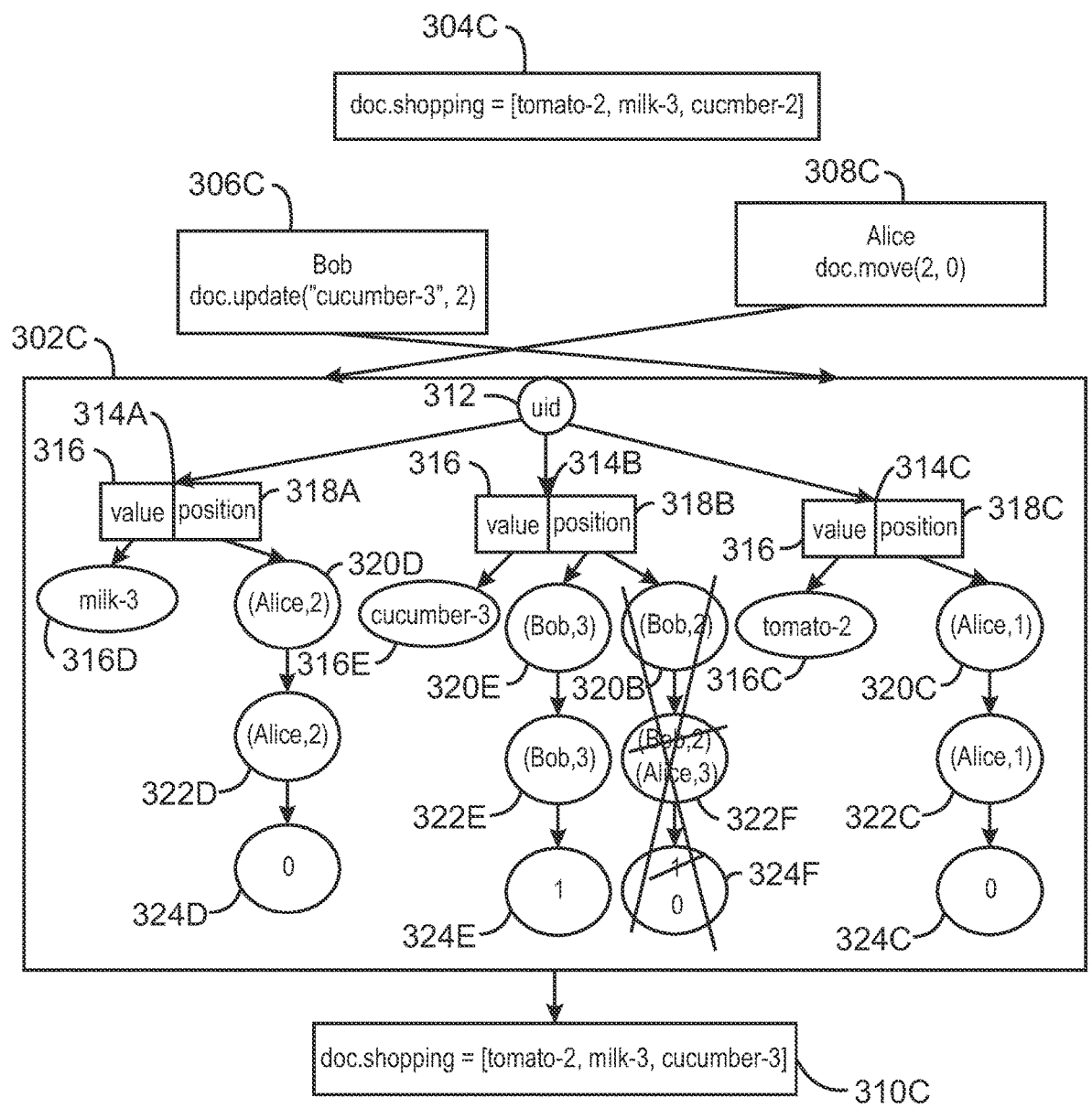
FIG. 3C is a block diagram of the example forest of a CompDotFun dot store having been synchronized after receiving concurrent mutations to update and move an element of a delta-based CRDT array.

FIG. 3C is a block diagram of the example system with a forest of a CompDotFun dot store having been synchronized after receiving concurrent mutations to update and move an element of a delta-based CRDT array. The example system 300C may be implemented using the system 100 of FIG. 1, the computing device 500 of FIG. 5 or the computer-readable media 800 of FIG. 8.

The system 300C of FIG. 3C includes similarly referenced elements from FIG. 3B. In addition, FIG. 3C includes an ORArray CRDT 302C based on an input array 304C and mutations 306C and 308C, received from users Bob and Alice, respectively. For example, the input array 304C may be the output array 310B of FIG. 3B. The ORArray CRDT 302C is shown outputting an output array 310C.

In the example of FIG. 3C, Alice concurrently moves the cucumbers to a beginning of the list in the virtual shopping cart. Bob concurrently updates the number of cucumbers in the virtual shopping cart that is implemented using a distributing computing system using a delta CRDT array. The move operation of Alice is reflected in the new values 322F and 324F in the tree beginning with value 320B. However, this tree is deleted by the update operation from Bob and a new tree with values 320E, 322E, and 324E is added to reflect the update operation in mutation 306C. In addition, the new number of cucumbers is indicated by an updated value 316E that replaces 316B. Thus, the output final array 310C is [tomato—2, milk—3, cucumber—3], having an updated number of cucumbers that remains in its original position.

It is to be understood that the block diagram of FIG. 3C is not intended to indicate that the system 300C is to include all of the components shown in FIG. 3C. Rather, the system 300C can include fewer or additional components not illustrated in FIG. 3C (e.g., additional users, mutations, trees, forests, unique identifiers, or alternative semantics, etc.). For example, the system 300C may alternatively have used remove-wins semantics, in which case the element of the output array 310C would have been both updated and moved and the forest structure would not be used. In various examples, the third level of position values may be replaced with any suitable position identifiers of any suitable position identifier system.

Figure 3D:
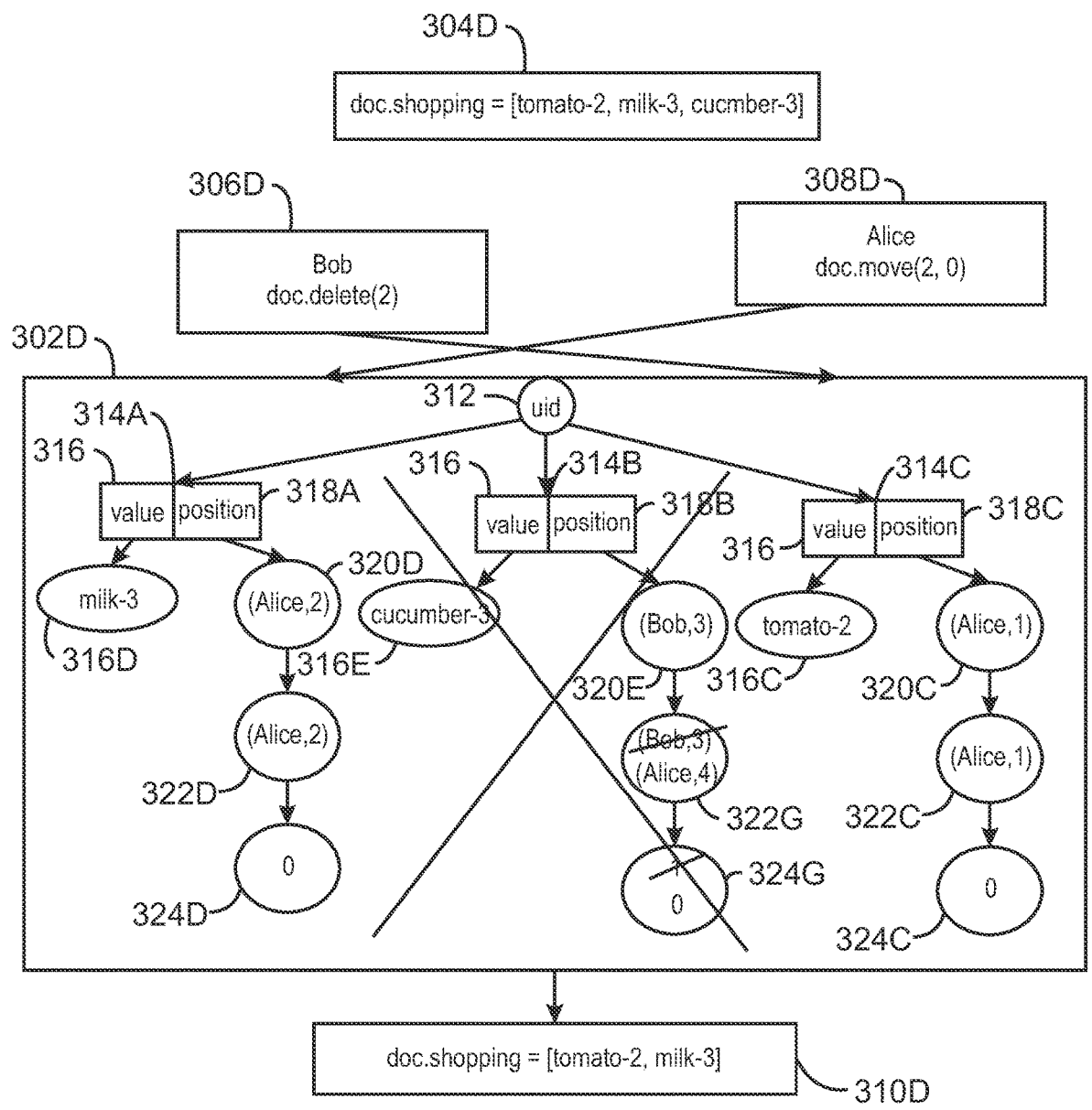
FIG. 3D is a block diagram of the example forest of a CompDotFun dot store having been synchronized after receiving concurrent mutations to delete and move an element of a delta-based CRDT array.

FIG. 3D is a block diagram of the example system with a forest of a CompDotFun dot store having been synchronized after receiving concurrent mutations to delete and move an element of a delta-based CRDT array. The example system 300D may be implemented using the system 100 of FIG. 1, the computing device 500 of FIG. 5 or the computer-readable media 800 of FIG. 8.

The system 300D of FIG. 3D includes similarly referenced elements from FIG. 3C. In addition, FIG. 3D includes an ORArray CRDT 302D based on an input array 304D and mutations 306D and 308D, received from users Bob and Alice, respectively. For example, the input array 304D may be the output array 310C of FIG. 3C. The ORArray CRDT 302D is shown outputting an output array 310D.

In the example of FIG. 3D, Alice again attempts to move the cucumbers to a beginning of the list in the virtual shopping cart that is implemented using a distributing computing system using a delta CRDT array. However, Bob concurrently removes the cucumbers from the virtual shopping cart. The move operation in the mutation 308D is reflected in the replacement of positions 322E and 324E with positions 322G and 324G in the tree beginning with the position 320E. However, the entire tree associated with cucumbers is removed, including the tree beginning with 320E as well as the value 316E, due to the delete operation in the mutation 306D from Bob. Thus, the resulting output array may be [tomato—2, milk—3], with the cucumbers removed from the shopping list array.

It is to be understood that the block diagram of FIG. 3D is not intended to indicate that the system 300D is to include all of the components shown in FIG. 3D. Rather, the system 300D can include fewer or additional components not illustrated in FIG. 3D (e.g., additional users, mutations, trees, forests, unique identifiers, or alternative semantics, etc.). For example, the system 300D may alternatively have used remove-wins semantics, in which case the output array 310D would have also have the cucumber element deleted and the forest structure would not be used. In various examples, the third level of position values may be replaced with any suitable position identifiers of any suitable position identifier system.

Figure 3E:
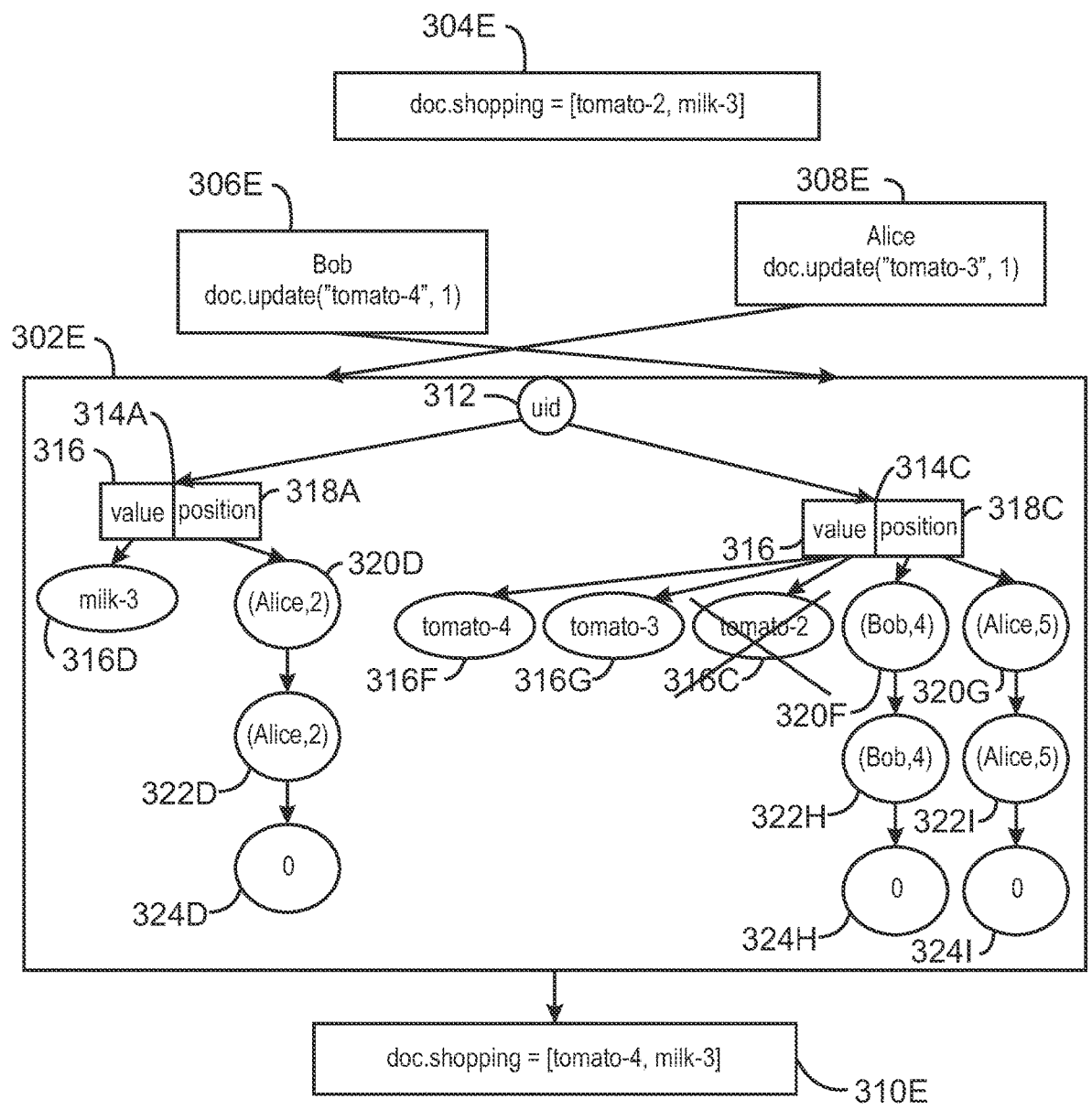
FIG. 3E is a block diagram of the example forest of a CompDotFun dot store having been synchronized after receiving concurrent mutations to update an element of a delta-based CRDT array.

FIG. 3E is a block diagram of the example system with a forest of a CompDotFun dot store having been synchronized after receiving concurrent mutations to update an element of a delta-based CRDT array. The example forest system 300E may be implemented using the system 100 of FIG. 1, the computing device 500 of FIG. 5 or the computer-readable media 800 of FIG. 8.

The system 300E of FIG. 3E includes similarly referenced elements from FIG. 3D. In addition, FIG. 3E includes an ORArray CRDT 302E based on an input array 304E and mutations 306E and 308E, received from users Bob and Alice, respectively. For example, the input array 304E may be the output array 310D of FIG. 3D. The ORArray CRDT 302E is shown outputting an output array 310E.

In the example of FIG. 3E, Alice updates the number of tomatoes to a total of three in the virtual shopping cart that is implemented using a distributing computing system using a delta CRDT array. Bob concurrently also updates the number of tomatoes to a total of four in the virtual shopping cart. In this example, the updated numbers of tomatoes from Alice and Bob are indicated by updated values 316F and 316G that replace original value 316C. In addition, two new trees beginning with roots 320F and 320G and include positions 322H and 324H, and 322I and 324I, respectively, have replaced the original tree that began with 320C. Thus, a conflict in the values part (as Alice and Bob both updated it, each to a different value). In various examples, the conflict in values may be resolved using any suitable deterministic manner. For example, the resolution of conflicting values may be handled by the underlying dot store which stores the value. As one example, if a MVReg is used for holding the values in the shopping cart, then the MVReg may resolve conflicts in the shopping cart. The resulting output array 310E is [tomato—4, milk—3] indicating that the update operation of the mutation 306E was applied and the value 316F is used for the tomatoes.

It is to be understood that the block diagram of FIG. 3E is not intended to indicate that the system 300E is to include all of the components shown in FIG. 3E. Rather, the system 300E can include fewer or additional components not illustrated in FIG. 3E (e.g., additional users, mutations, trees, forests, unique identifiers, or alternative semantics, etc.). For example, the system 300E may alternatively have used remove-wins semantics, in which case the output array would be the same and the forest structure would not be used. In various examples, the third level of position values may be replaced with any suitable position identifiers of any suitable position identifier system.

Figure 3F:
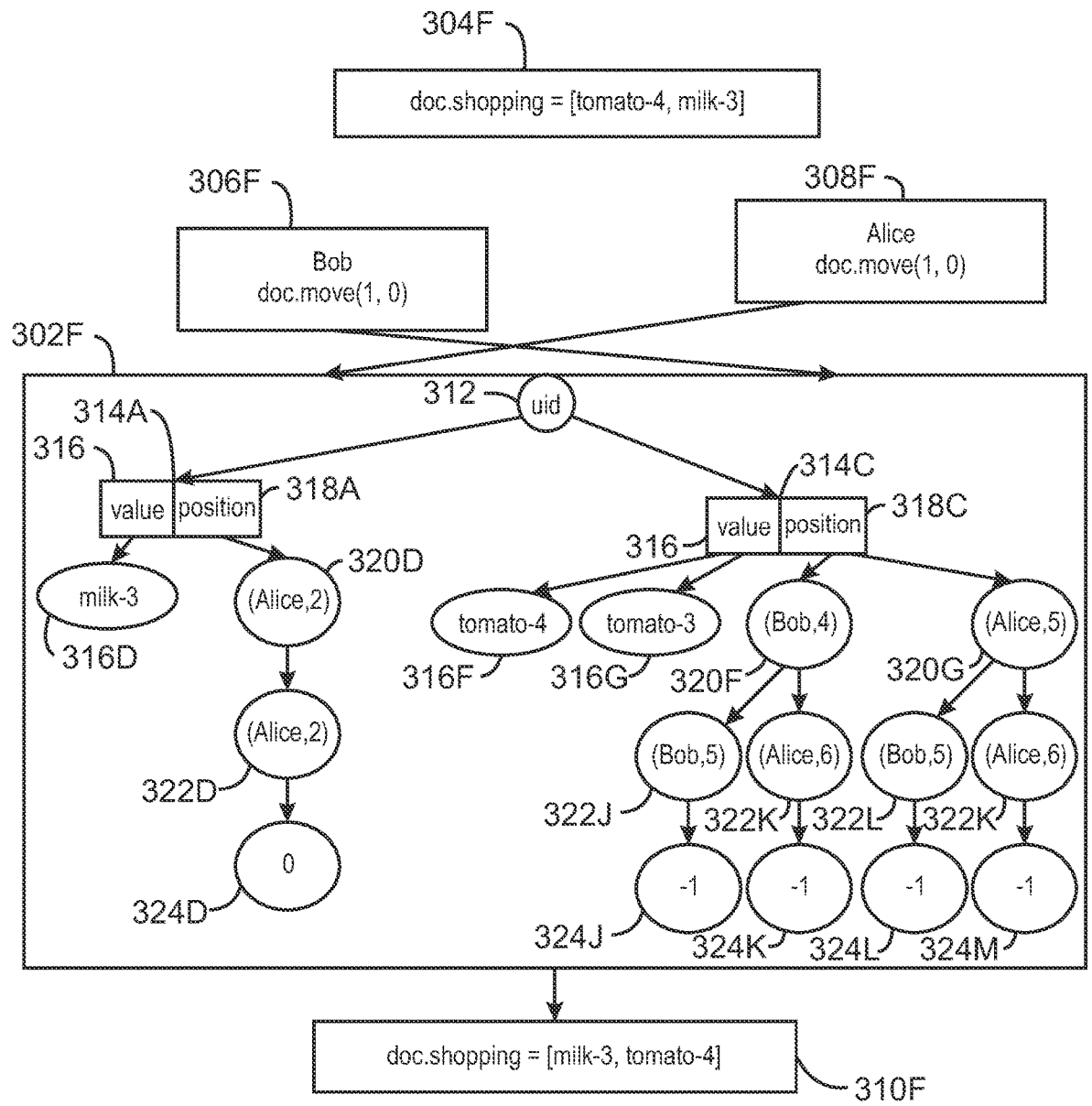
FIG. 3F is a block diagram of the example forest of a CompDotFun dot store having been synchronized after receiving concurrent mutations to move an element of a delta-based CRDT array.

FIG. 3F is a block diagram of the example system with a forest of a CompDotFun dot store having been synchronized after receiving concurrent mutations to move an element of a delta-based CRDT array. The example system 300F may be implemented using the system 100 of FIG. 1, the computing device 500 of FIG. 5 or the computer-readable media 800 of FIG. 8.

The system 300F of FIG. 3F includes similarly referenced elements from FIG. 3E. In addition, FIG. 3D includes an ORArray CRDT 302F based on an input array 304F and mutations 306F and 308F, received from users Bob and Alice, respectively. For example, the input array 304F may be the output array 310E of FIG. 3E. The ORArray CRDT 302F is shown outputting an output array 310F.

In the example of FIG. 3F, the first user Bob and the second user Alice both concurrently move the tomatoes to the beginning of the list in the virtual shopping cart that is implemented using a distributing computing system using a delta CRDT array. In this example, a second branch is added to the trees beginning with positions 320F and 320G corresponding to the move operations received from the mutations 306F and 308F. In particular, the previous positions 322H and 324H have been replaced with positions 322J and 324J and the positions 322K and 324K have been added as a second branch to the tree with beginning position 320F. In addition, positions 322I and 324I has been replaced with positions 322K and 324M, and the positions 322L and 324L have been added as a second branch to the tree with beginning position 320G. Thus, the trees of 320F and 320G are similarly modified, with a current subtree being replaced with the user's new position for the element, and a new separate subtree reflecting the other user's new position for the element added. The output array 310F may result in the moving of milk—3 to the beginning of the array. Moreover, the moved array element milk—3 only appears once in the array and is thus not duplicated.

It is to be understood that the block diagram of FIG. 3F is not intended to indicate that the system 300F is to include all of the components shown in FIG. 3F. Rather, the system 300F can include fewer or additional components not illustrated in FIG. 3F (e.g., additional users, mutations, trees, forests, unique identifiers, or alternative semantics, etc.). For example, the system 300F may alternatively have used remove-wins semantics, in which case the output array would be the same and the forest structure would not be used. In various examples, the third level of position values may be replaced with any suitable position identifiers of any suitable position identifier system.

Figure 4A:
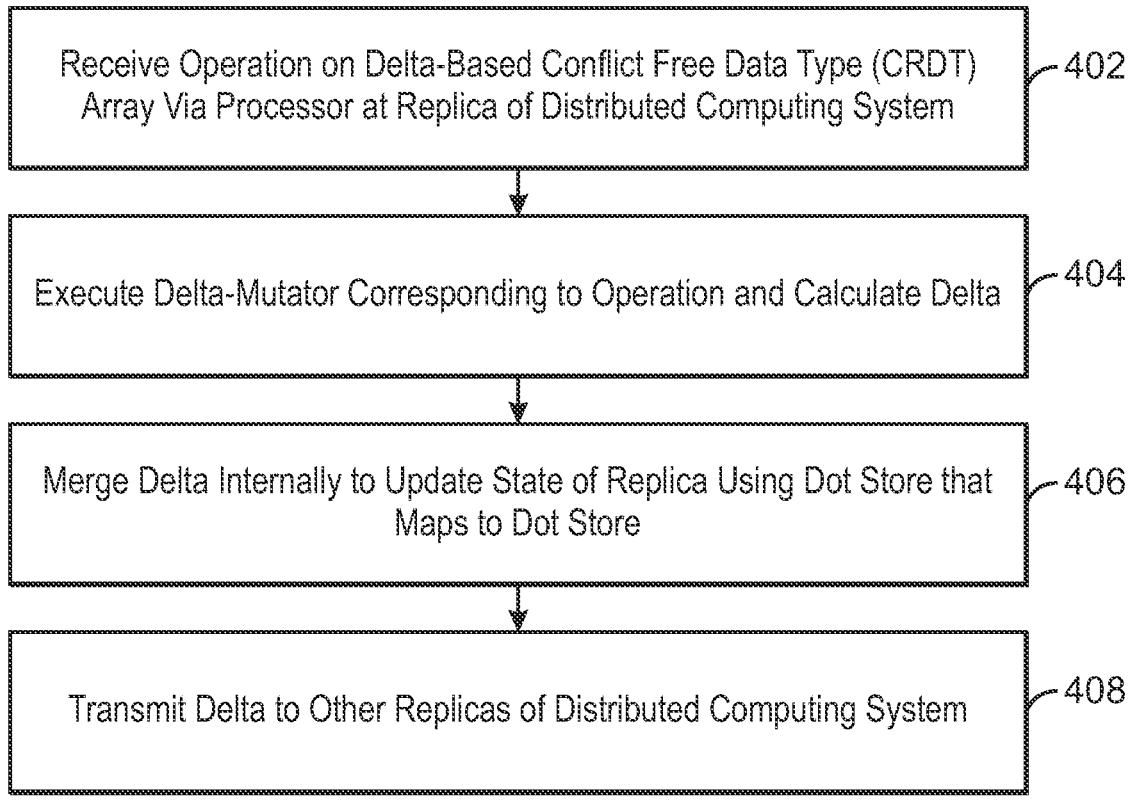
FIG. 4A is a block diagram of an example method that can synchronize delta-based CRDT arrays.

FIG. 4A is a process flow diagram of another example method that can synchronize delta-based CRDT arrays. The method 400A can be implemented with any suitable computing device, such as the computing device 500 of FIG. 5 and is described with reference to the system 100 of FIG. 1. For example, the method described below can be implemented by the processor 502 of the computing device 500 or the processor 802 of FIGS. 5 and 8.

At block 402, an operation on a delta-based conflict free data type (CRDT) array is received via a processor at a replica of a distributed computing system. For example, the delta-based CRDT array may be an observed-remove array or a remove-wins array. In various examples, the operation may be an insert operation, a delete operation, a move operation, or an update operation.

At block 404, a delta-mutator corresponding to the operation is executed and a delta calculated. For example, the delta may be generated by applying the delta-mutator to a current state of the replica.

At block 406, the delta is merged internally to update the state of the replica using a dot store that maps dots to a dot store. For example, the delta may be merged internally using the CompDotFun dot store described herein. In various example, the delta may be processed recursively by a number of components. The portion of the delta associated with the delta-based CRDT array may be processed using the CompDotFun dot store.

At block 408, the delta is transmitted to other replicas of the distributed computing system. In various examples, the delta may be used by the other replicas to synchronize with the transmitting replica. For example, the other replicas may synchronize with the transmitting replica using the method 400B of FIG. 4B below.

The process flow diagram of FIG. 4A is not intended to indicate that the operations of the method 400A are to be executed in any particular order, or that all of the operations of the method 400A are to be included in every case. Additionally, the method 400A can include any suitable number of additional operations.

Figure 4B:
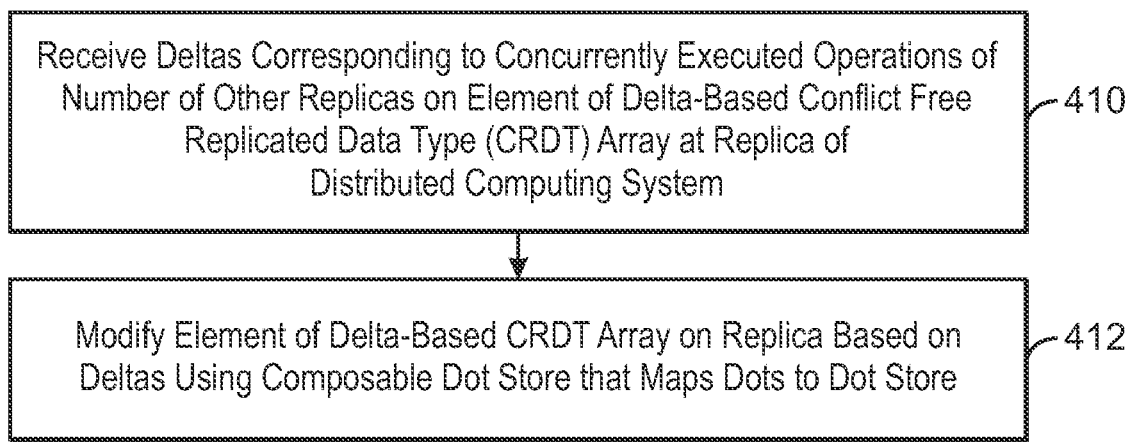
FIG. 4B is a block diagram of another example method that can synchronize delta-based CRDT arrays.

FIG. 4B is a process flow diagram of another example method that can synchronize delta-based CRDT arrays. The method 400B can be implemented with any suitable computing device, such as the computing device 500 of FIG. 5 and is described with reference to the system 100 of FIG. 1. For example, the method described below can be implemented by the processor 502 of the computing device 500 or the processor 802 of FIGS. 5 and 8.

At block 410, deltas corresponding to concurrently executed operations of a number of other replicas on an element of a delta-based conflict free data type (CRDT) array are received via a processor at a replica of a distribution computing system. For example, the delta-based CRDT array may be an observed-remove array or a remove-wins array. In various examples, the concurrently executed operations may include any combination of an insert operation, a delete operation, a move operation, or an update operation. In some examples, the deltas may be delta-groups.

At block 412, the element of the delta-based CRDT array on the replica is modified based on the deltas using a dot store that maps dots to a dot store. For example, the dot store may be the CompDotFun described herein. In some examples, a value of the element may be updated in an observed-remove array in response to detecting that the concurrent mutations include an update operation and a delete operation on the element. In some examples, a value of the element may be updated in an observed-remove array in response to detecting that the concurrent mutations include an update operation and a move operation on the element. In various examples, the element may be deleted from an observed-remove array in response to detecting that the concurrent mutations include a delete operation and a move operation on the element. In some examples, the element may be both updated and moved in a remove-wins array in response to detecting that the concurrent mutations include an update operation and a move operation on the element. In various examples, the element may be deleted from the remove-wins array in response to detecting that the concurrent mutations include a delete operation and a move operation on the element. In some examples, the element may be deleted from the remove-wins array in response to detecting that the concurrent mutations include a delete operation and an update operation on the element. In various examples, the element in an observed-remove array or a remove-wins array may be moved to generate a delta-based CRDT array including an unduplicated moved array element in response to detecting that the concurrent mutations include a number of move operations.

The process flow diagram of FIG. 4B is not intended to indicate that the operations of the method 400B are to be executed in any particular order, or that all of the operations of the method 400B are to be included in every case. Additionally, the method 400B can include any suitable number of additional operations. For example, the delta may transmitted to an additional replica of the distributed computing system.

In some scenarios, the techniques described herein may be implemented in a cloud computing environment. As discussed in more detail below in reference to at least FIGS. 5-8, a computing device configured to modify elements in delta-based CRDT arrays may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
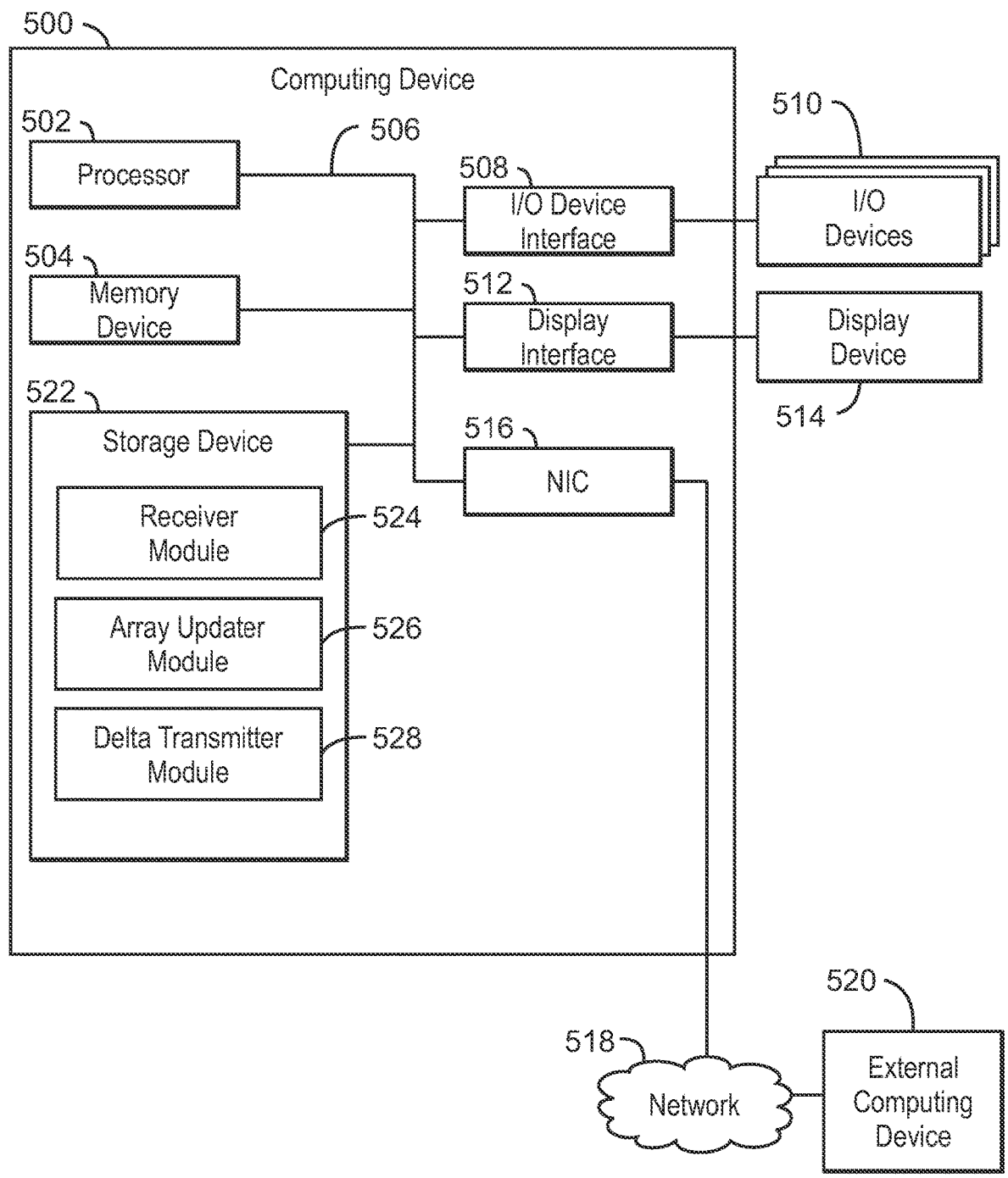
FIG. 5 is a block diagram of an example computing device that can synchronize delta-based CRDT arrays.

FIG. 5 is block diagram of an example computing device that can synchronize delta-based CRDT arrays. The computing device 500 may be for example, a server, desktop computer, laptop computer, tablet computer, or smartphone. In some examples, computing device 500 may be a cloud computing node. For example, the computing device 500 may be a replica of a distributed computing system. In some examples, the distributed computing system may be a NoSQL distributed database system. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external webserver 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, an array updater module 526, and a delta transmitter module 528. The receiver module 524 can receive deltas corresponding to concurrently executed operations of a number of other replicas on an element of a delta-based conflict free replicated data type (CRDT) array. For example, the processor 502 may be of a first replica of a distributed computing system. In various examples, the concurrently executed operations may include two of any combination of a delete operation, a move operation, an insert operation, or an update operation. In some examples, the delta-based CRDT array is an observed-remove array based on a set of update-delete-move (UDM) semantics. For example, in an observed-remove array, a position of the element may be stored in a forest in a CompDotFun dot store. In various examples, an update or a delete operation removes an entire tree from a root in the forest. In some examples, a concurrent update to a value of a key and a remove of the key may result in the key being deleted from the CompDotFun dot store. In some examples, the delta-based CRDT array is a remove-wins array based on a set of remove-wins semantics. In various examples, the delta-based CRDT array may be a nested array. In some examples, the receiver module 524 can receive an operation on the delta-based conflict free data type (CRDT) array via a processor at the first replica of the distributed computing system. The array updater module 526 can modify the element of the delta-based CRDT array based on the deltas using a CompDotFun dot store that maps dots to a dot store. For example, the element may be modified using a forest of the CompDotFun dot store. In various examples, an order of precedence of the operations performed on each element in the delta-based CRDT array is applied separately. For example, although all items in each array may be governed by the same logic and semantics, the logic may be applied to each element separately. In some examples, the array updater module 526 can execute a delta-mutator corresponding to the operation and calculate a delta-mutation, aka delta. The updater module 526 can then merge the delta internally to update a state of the first replica. The delta transmitter module 528 can transmit the delta to the other replicas of the distributed computing system.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the receiver 524, the array updater module 526, and the delta transmitter module 528 may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 324, array updater module 326, and delta transmitter module 328 can be implemented with logic, wherein the logic, as referred to herein, can include any suitable hardware (e.g., a processor, among others), software (e.g., an application, among others), firmware, or any suitable combination of hardware, software, and firmware.

Figure 6:
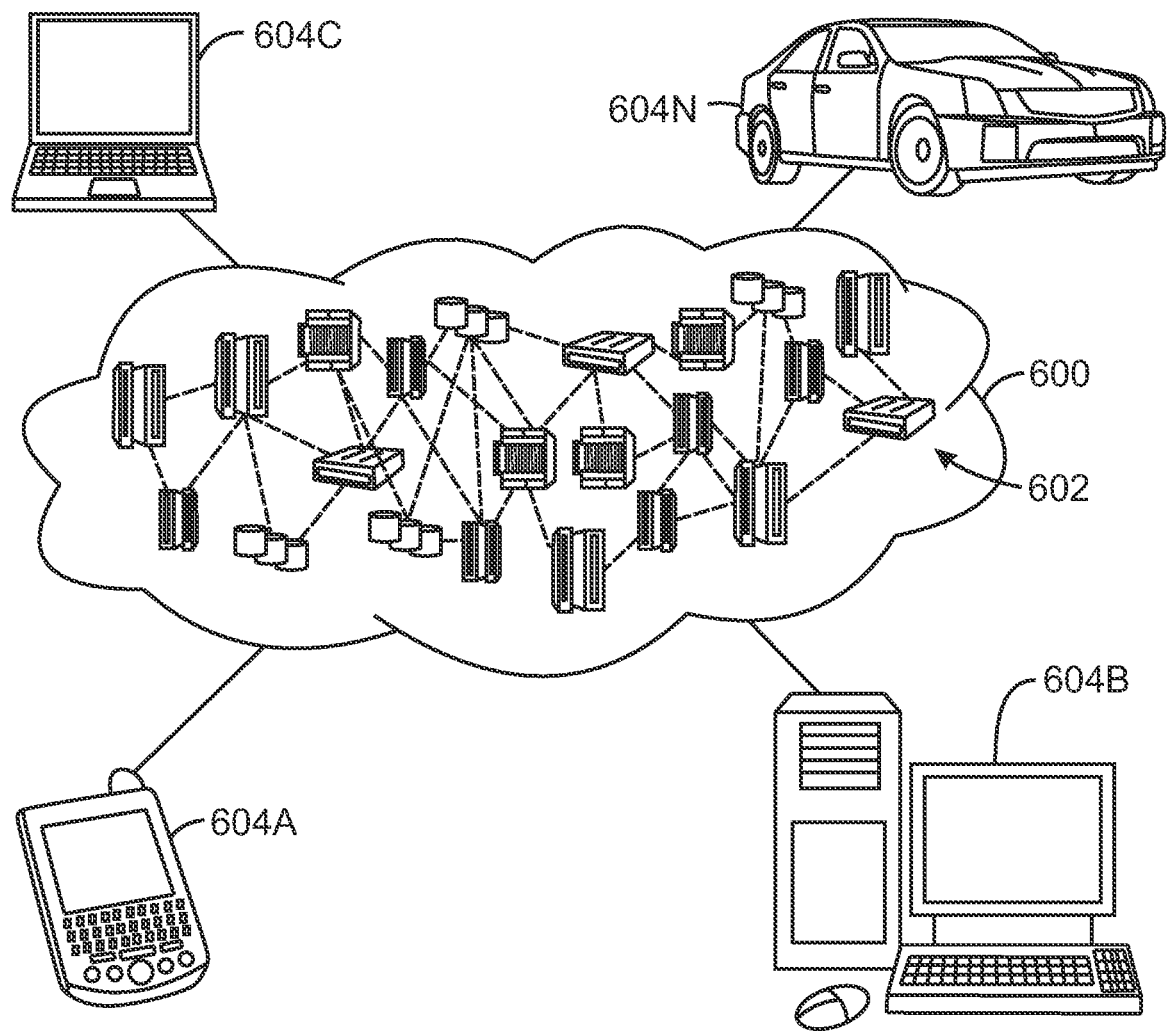
FIG. 6 is a diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
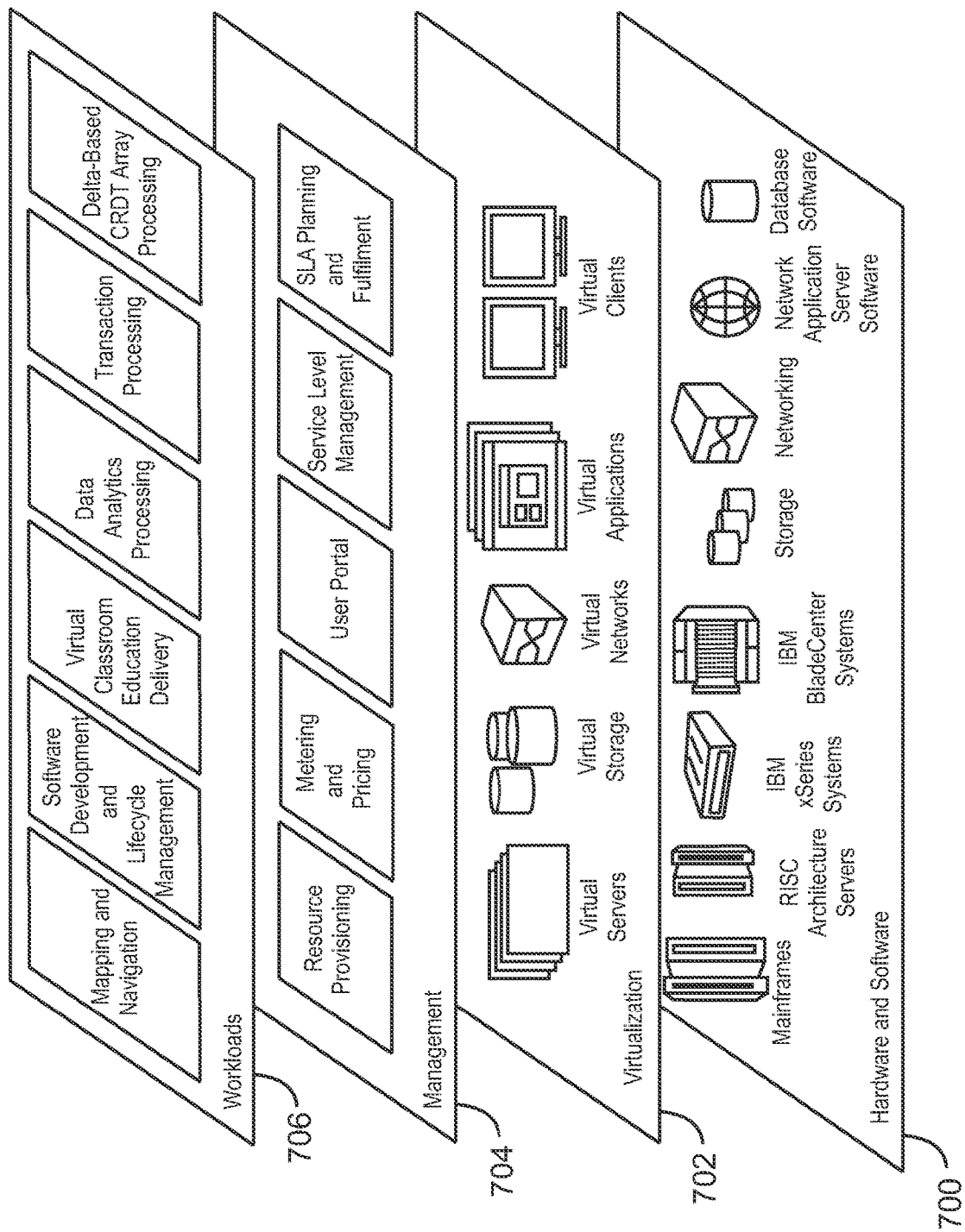
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 1000 includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and delta-based CRDT array processing.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
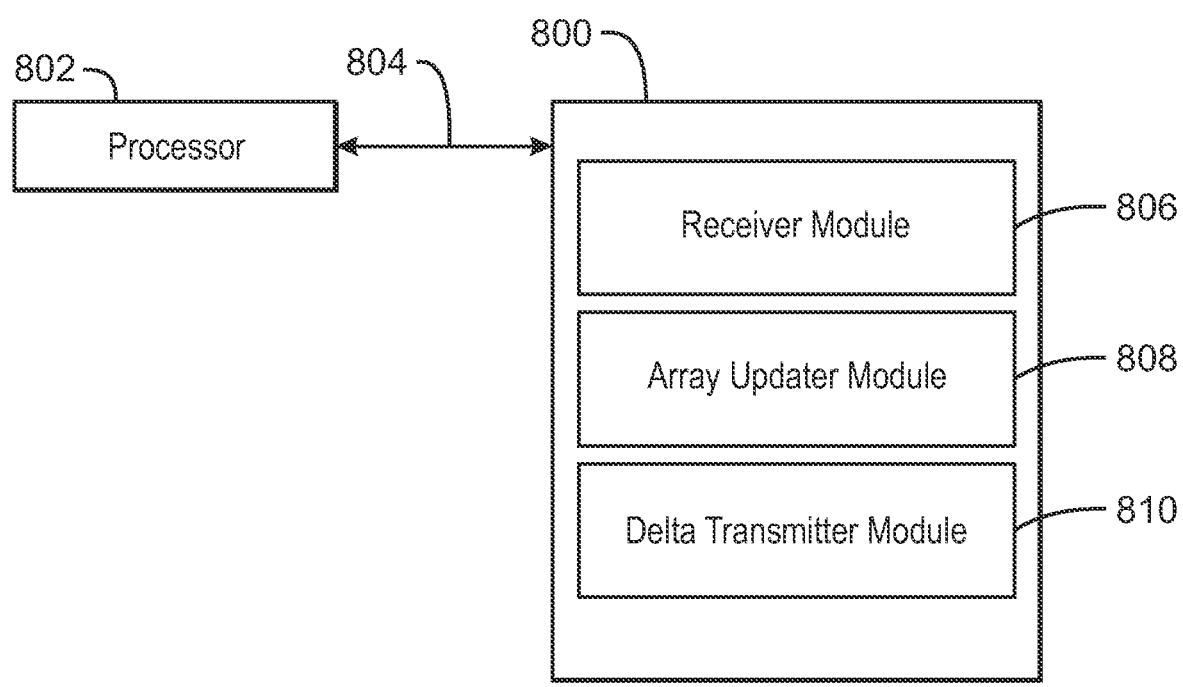
FIG. 8 is an example tangible, non-transitory computer-readable medium that can synchronize delta-based CRDT arrays.

Referring now to FIG. 8, a block diagram is depicted of an example tangible, non-transitory computer-readable medium 800 that can synchronize delta-based CRDT arrays. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 400A and 400B of FIGS. 4A and 4B.

The various software components discussed herein may be stored on the tangible, non-transitory, computer-readable medium 800, as indicated in FIG. 8. For example, a receiver module 806 includes code to receive, at a first replica of a distributed computing system, deltas corresponding to concurrently executed operations of a number of other replicas on an element of a delta-based conflict free data type (CRDT) array of a replica. The receiver module 806 also includes code to receive deltas corresponding to concurrently executed operations including an insert operation, a delete operation, a move operation, or an update operation. In some examples, the receiver module 806 includes code to receive an operation on the delta-based conflict free data type (CRDT) array via a processor at the first replica of the distributed computing system. For example, the operation may be received from a user of the first replica. An array updater module 808 includes code to modify the element of the delta-based CRDT array on the replica based on the deltas using a dot store that maps dots to a dot store. For example, the dot store may be the CompDotFun dot store described herein. In some examples, the array updater module 808 includes code to update a value of the element in an observed-remove array in response to detecting that the concurrent mutations include an update operation and a delete operation on the element. In some examples, the array updater module 808 includes code to update a value of the element in an observed-remove array in response to detecting that the concurrent mutations include an update operation and a move operation on the element. In various examples, the array updater module 808 includes code to delete the element in an observed-remove array in response to detecting that the concurrent mutations include a delete operation and a move operation on the element. In some examples, the array updater module 808 includes code to both update and move the element in a remove-wins array in response to detecting that the concurrent mutations include an update operation and a move operation on the element. In various examples, the array updater module 808 includes code to delete the element from a remove-wins array in response to detecting that the concurrent mutations include a delete operation and a move operation on the element, and in response to detecting that the concurrent mutations include a delete operation and an update operation on the element. In some examples, the array updater module 808 includes code to execute a delta-mutator corresponding to the operation and calculate a delta. The array updater module 808 includes code to merge the delta internally to update a state of the first replica. A delta transmitter module 810 includes code to transmit the delta to the other replicas of the distributed computing system.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising a processor to:
receive, at a first replica of a distributed computing system, deltas corresponding to concurrently executed operations of a plurality of other replicas on an element of a delta-based conflict free replicated data type (CRDT) array, wherein the delta-based CRDT array comprises a remove-wins array based on a set of remove-wins semantics or an observed-remove array based on a set of update-delete-move (UDM) semantics; and modify, at the first replica, the element of the delta-based CRDT array based on the deltas using a dot store that maps dots to a dot store.

2. The system of claim 1, wherein a concurrent update to a value of a key and a remove of the key results in the key being deleted from the dot store.

3. The system of claim 1, wherein a position of the element is stored in a forest in the dot store and the element is modified using the forest, wherein an update or a delete operation removes an entire tree from a root in the forest.

4. The system of claim 1, wherein the delta-based CRDT array comprises a nested array.

5. The system of claim 1, wherein the processor is to:
receive an operation on the delta-based conflict free data type (CRDT) array via a processor at the first replica of the distributed computing system;
execute a delta-mutator corresponding to the operation and calculate a delta;
merge the delta internally to update a state of the first replica; and
transmit the delta to the other replicas of the distributed computing system.

6. The system of claim 1, wherein the concurrently executed operations comprise an update operation, a delete operation, a move operation, or an insert operation.

7. A computer-implemented method, comprising:
receiving, via a processor at a replica of a distribution computing system, deltas corresponding to concurrently executed operations of a plurality of other replicas on an element of a delta-based conflict free data type (CRDT) array, wherein the delta-based CRDT array comprises a remove-wins array based on a set of remove-wins semantics or an observed-remove array based on a set of update-delete-move (UDM) semantics; and
modifying, via the processor, the element of the delta-based CRDT array on the replica based on the deltas using a dot store that maps dots to a dot store.

8. The computer-implemented method of claim 7, wherein the delta-based CRDT array comprises the observed-remove array, and wherein modifying the element comprises updating a value of the element in the observed-remove array in response to detecting that the concurrent mutations comprise an update operation and a delete operation on the element.

9. The computer-implemented method of claim 7, wherein the delta-based CRDT array comprises the observed-remove array, and wherein modifying the element comprises updating a value of the element in the observed-remove array in response to detecting that the concurrent mutations comprise an update operation and a move operation on the element.

10. The computer-implemented method of claim 7, wherein the delta-based CRDT array comprises the observed-remove array, and wherein modifying the element comprises deleting the element from the observed-remove array in response to detecting that the concurrent mutations comprise a delete operation and a move operation on the element.

11. The computer-implemented method of claim 7, wherein the delta-based CRDT array comprises the remove-wins array, and wherein modifying the element comprises both updating and moving the element in the remove-wins array in response to detecting that the concurrent mutations comprise an update operation and a move operation on the element.

12. The computer-implemented method of claim 7, wherein the delta-based CRDT array comprises the remove-wins array, and wherein modifying the element comprises deleting the element from the remove-wins array in response to detecting that the concurrent mutations comprise a delete operation and a move operation on the element.

13. The computer-implemented method of claim 7, wherein the delta-based CRDT array comprises the remove-wins array, and wherein modifying the element comprises deleting the element from the remove-wins array in response to detecting that the concurrent mutations comprise a delete operation and an update operation on the element.

14. The computer-implemented method of claim 7, wherein the delta-based CRDT array comprises the observed-remove array or a remove-wins array, and wherein modifying the element comprises moving the element in the observed-remove array or the remove-wins array to generate a delta-based CRDT array comprising an unduplicated moved array element in response to detecting that the concurrent mutations comprise a plurality of move operations.

15. The computer-implemented method of claim 7, comprising:
receiving, via the processor, an operation on the delta-based conflict free data type (CRDT) array via a processor at the replica of the distributed computing system;
executing, via the processor, a delta-mutator corresponding to the operation and calculate a delta;
merging, via the processor, the delta internally to update a state of the replica; and
transmitting, via the processor, the delta to the other replicas of the distributed computing system.

16. A computer program product for modifying elements of delta-based conflict-free replicated data types (CRDT) arrays, the computer program product comprising a computer-readable storage medium having program code embodied therewith, wherein the computer-readable storage medium is not a transitory signal per se, the program code executable by a processor to cause the processor to:
receive, at a first replica of a distributed computing system, deltas corresponding to concurrently executed operations of a plurality of other replicas on an element of a delta-based conflict free data type (CRDT) array of a replica, wherein the delta-based CRDT array comprises a remove-wins array based on a set of remove-wins semantics or an observed-remove array based on a set of update-delete-move (UDM) semantics; and
modify the element of the delta-based CRDT array on the replica based on the deltas using a dot store that maps dots to a dot store.

17. The computer program product of claim 16, further comprising program code executable by the processor to update a value of the element in the observed-remove array in response to detecting that the concurrent mutations comprise an update operation and a delete operation on the element.

18. The computer program product of claim 16, further comprising program code executable by the processor to update a value of the element in the observed-remove array in response to detecting that the concurrent mutations comprise an update operation and a move operation on the element.

19. The computer program product of claim 16, further comprising program code executable by the processor to delete the element in the observed-remove array in response to detecting that the concurrent mutations comprise a delete operation and a move operation on the element.

* * * * *